(12) United States Patent
Gusarov et al.

(10) Patent No.: US 11,631,276 B2
(45) Date of Patent: Apr. 18, 2023

(54) AUTOMATED AVATAR GENERATION

(71) Applicant: Snap Inc., Santa Monica, CA (US)

(72) Inventors: Maksim Gusarov, Marina del Rey, CA (US); Igor Kudriashov, Saratov (RU); Valerii Filev, Santa Monica, CA (US); Sergei Kotcur, Sochi (RU)

(73) Assignee: Snap Inc., Santa Monica, CA (US)

( * ) Notice: Subject to any disclaimer, the term of this patent is extended or adjusted under 35 U.S.C. 154(b) by 122 days.

(21) Appl. No.: 17/303,875

(22) Filed: Jun. 9, 2021

(65) Prior Publication Data
US 2021/0295018 A1 Sep. 23, 2021

Related U.S. Application Data

(63) Continuation of application No. 16/409,390, filed on May 10, 2019, now Pat. No. 11,048,916, which is a continuation of application No. 15/086,749, filed on Mar. 31, 2016, now Pat. No. 10,339,365.

(51) Int. Cl.
*G06V 40/16* (2022.01)
*G06T 13/40* (2011.01)

(52) U.S. Cl.
CPC ............ *G06V 40/171* (2022.01); *G06T 13/40* (2013.01); *G06V 40/165* (2022.01)

(58) Field of Classification Search
CPC .... G06V 40/171; G06V 40/165; G06T 13/40; G06T 7/11; G06T 7/40; G06T 2207/30201
See application file for complete search history.

(56) References Cited

U.S. PATENT DOCUMENTS

| 666,223 A | 1/1901 | Shedlock |
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |

(Continued)

FOREIGN PATENT DOCUMENTS

| CA | 2887596 A1 | 7/2015 |
| CN | 1455374 | 11/2003 |

(Continued)

OTHER PUBLICATIONS

"U.S. Appl. No. 17/314,963, Non Final Office Action dated Feb. 2, 2022", 24 pgs.

(Continued)

*Primary Examiner* — Wesley J Tucker
(74) *Attorney, Agent, or Firm* — Schwegman Lundberg & Woessner, P.A.

(57) ABSTRACT

Systems, devices, media, and methods are presented for generating facial representations using image segmentation with a client device. The systems and methods receive an image depicting a face, detect at least a portion of the face within the image, and identify a set of facial landmarks within the portion of the face. The systems and methods determine one or more characteristics representing the portion of the face, in response to detecting the portion of the face. Based on the one or more characteristics and the set of facial landmarks, the systems and methods generate a representation of a face.

20 Claims, 10 Drawing Sheets

(56) References Cited

U.S. PATENT DOCUMENTS

| | | |
|---|---|---|
| 5,826,269 A | 10/1998 | Hussey |
| 5,855,008 A | 12/1998 | Goldhaber et al. |
| 5,880,731 A | 3/1999 | Liles et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,023,270 A | 2/2000 | Brush, II et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,374,292 B1 | 4/2002 | Srivastava et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,473,794 B1 | 10/2002 | Guheen et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,633,289 B1 * | 10/2003 | Lotens ............... G06T 11/00 |
| | | 715/848 |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,772,195 B1 | 8/2004 | Hatlelid et al. |
| 6,832,222 B1 | 12/2004 | Zimowski |
| 6,834,195 B2 | 12/2004 | Brandenberg et al. |
| 6,836,792 B1 | 12/2004 | Chen |
| 6,839,411 B1 | 1/2005 | Saltanov et al. |
| 6,842,779 B1 | 1/2005 | Nishizawa |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,073,129 B1 | 7/2006 | Robarts et al. |
| 7,079,158 B2 | 7/2006 | Lambertsen |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,123 B2 | 10/2007 | Bentley et al. |
| 7,280,658 B2 | 10/2007 | Amini et al. |
| 7,315,823 B2 | 1/2008 | Brondrup |
| 7,342,587 B2 | 3/2008 | Danzig et al. |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,468,729 B1 | 12/2008 | Levinson |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,469 B2 | 5/2009 | Kim et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,627,828 B1 | 12/2009 | Collison et al. |
| 7,636,755 B2 | 12/2009 | Blattner et al. |
| 7,639,251 B2 | 12/2009 | Gu et al. |
| 7,639,943 B1 | 12/2009 | Kalajan |
| 7,650,231 B2 | 1/2010 | Gadler |
| 7,668,537 B2 | 2/2010 | DeVries |
| 7,689,649 B2 | 3/2010 | Heikes et al. |
| 7,703,140 B2 | 4/2010 | Nath et al. |
| 7,711,155 B1 | 5/2010 | Sharma et al. |
| 7,770,137 B2 | 8/2010 | Forbes et al. |
| 7,775,885 B2 | 8/2010 | Van et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |
| 8,090,351 B2 | 1/2012 | Klein |
| 8,095,878 B2 | 1/2012 | Bates et al. |
| 8,098,904 B2 | 1/2012 | Ioffe et al. |
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |

(56) References Cited

U.S. PATENT DOCUMENTS

| | | |
|---|---|---|
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 | 11/2014 | Nims et al. |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,135,726 B2 | 9/2015 | Kafuku |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,285,951 B2 | 3/2016 | Makofsky et al. |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |

(56) References Cited

U.S. PATENT DOCUMENTS

| | | |
|---|---|---|
| 9,459,778 B2 | 10/2016 | Hogeg et al. |
| 9,460,541 B2 | 10/2016 | Li et al. |
| 9,480,924 B2 | 11/2016 | Haslam |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,635,195 B1 | 4/2017 | Green et al. |
| 9,641,870 B1 | 5/2017 | Cormie et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,121,055 B1 | 11/2018 | Sawides et al. |
| 10,127,945 B2 | 11/2018 | Ho et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,325,417 B1 * | 6/2019 | Scapel .................. G06T 7/246 |
| 10,339,365 B2 | 7/2019 | Gusarov et al. |
| 10,360,708 B2 | 7/2019 | Bondich et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,880,246 B2 | 12/2020 | Baldwin et al. |
| 10,938,758 B2 | 3/2021 | Allen et al. |
| 10,952,013 B1 | 3/2021 | Brody et al. |
| 10,963,529 B1 | 3/2021 | Amitay et al. |
| 10,984,569 B2 | 4/2021 | Bondich et al. |
| 11,048,916 B2 | 6/2021 | Gusarov et al. |
| 2002/0024528 A1 | 2/2002 | Lambertsen |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0143136 A1 | 6/2005 | Lev et al. |
| 2005/0144241 A1 | 6/2005 | Stata et al. |
| 2005/0162419 A1 | 7/2005 | Kim et al. |
| 2005/0020661 A1 | 9/2005 | Cordelli |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |

(56) References Cited

U.S. PATENT DOCUMENTS

| | | |
|---|---|---|
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0174273 A1 | 7/2007 | Jones et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0260984 A1 | 11/2007 | Marks et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0021421 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |
| 2009/0016617 A1 | 1/2009 | Bregman-amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0044113 A1* | 2/2009 | Jones ............... G06T 13/40 715/707 |
| 2009/0047972 A1 | 2/2009 | Neeraj |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079743 A1 | 3/2009 | Pearson et al. |
| 2009/0079846 A1 | 3/2009 | Chou |
| 2009/0008971 A1 | 4/2009 | Wood et al. |
| 2009/0087035 A1* | 4/2009 | Wen ............... G06V 40/168 382/118 |
| 2009/0089678 A1 | 4/2009 | Sacco et al. |
| 2009/0093261 A1 | 4/2009 | Ziskind |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132371 A1 | 5/2009 | Strietzel et al. |
| 2009/0132453 A1 | 5/2009 | Hangartner et al. |
| 2009/0132665 A1 | 5/2009 | Thomsen et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0175521 A1 | 7/2009 | Shadan et al. |
| 2009/0177299 A1 | 7/2009 | Bartel Marinus |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0254859 A1 | 10/2009 | Arrasvuori et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0011422 A1 | 1/2010 | Mason et al. |
| 2010/0023885 A1 | 1/2010 | Reville et al. |
| 2010/0058212 A1 | 3/2010 | Belitz et al. |
| 2010/0062794 A1 | 3/2010 | Han |
| 2010/0073458 A1 | 3/2010 | Pace |
| 2010/0082427 A1 | 4/2010 | Burgener et al. |
| 2010/0082693 A1 | 4/2010 | Hugg et al. |
| 2010/0083138 A1 | 4/2010 | Dawson et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115426 A1 | 5/2010 | Liu et al. |
| 2010/0121915 A1 | 5/2010 | Wang |

(56) References Cited

U.S. PATENT DOCUMENTS

| | | |
|---|---|---|
| 2010/0130233 A1 | 5/2010 | Parker |
| 2010/0131880 A1 | 5/2010 | Lee et al. |
| 2010/0131895 A1 | 5/2010 | Wohlert |
| 2010/0146407 A1 | 6/2010 | Bokor et al. |
| 2010/0153144 A1 | 6/2010 | Miller et al. |
| 2010/0153868 A1 | 6/2010 | Allen et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185640 A1 | 7/2010 | Dettinger et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0197396 A1 | 8/2010 | Fujii et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Booking et al. |
| 2010/0273509 A1 | 10/2010 | Sweeney et al. |
| 2010/0274724 A1 | 10/2010 | Bible, Jr. et al. |
| 2010/0279713 A1 | 11/2010 | Dicke |
| 2010/0281045 A1 | 11/2010 | Dean |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2010/0332980 A1 | 12/2010 | Sun et al. |
| 2011/0004071 A1 | 1/2011 | Faiola et al. |
| 2011/0010205 A1 | 1/2011 | Richards |
| 2011/0022965 A1 | 1/2011 | Lawrence et al. |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0047505 A1 | 2/2011 | Fillion et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0113323 A1 | 5/2011 | Fillion et al. |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238762 A1 | 9/2011 | Soni et al. |
| 2011/0238763 A1 | 9/2011 | Shin et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0248992 A1 | 10/2011 | Van et al. |
| 2011/0249891 A1 | 10/2011 | Li |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0285703 A1 | 11/2011 | Jin |
| 2011/0286586 A1 | 11/2011 | Saylor et al. |
| 2011/0292051 A1 | 12/2011 | Nelson et al. |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0013770 A1 | 1/2012 | Stafford et al. |
| 2012/0015673 A1 | 1/2012 | Klassen et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0069028 A1 | 3/2012 | Bouguerra |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0139830 A1 | 6/2012 | Hwang et al. |
| 2012/0141046 A1 | 6/2012 | Chen et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De et al. |
| 2012/0212632 A1 | 8/2012 | Mate et al. |
| 2012/0215879 A1 | 8/2012 | Bozo |
| 2012/0220264 A1 | 8/2012 | Kawabata |
| 2012/0223940 A1 | 9/2012 | Dunstan et al. |
| 2012/0226748 A1 | 9/2012 | Bosworth et al. |
| 2012/0229506 A1 | 9/2012 | Nishikawa |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |

(56) References Cited

U.S. PATENT DOCUMENTS

| | | |
|---|---|---|
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290977 A1 | 11/2012 | Devecka |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Ford et al. |
| 2012/0307112 A1 | 12/2012 | Kunishige et al. |
| 2012/0309520 A1* | 12/2012 | Evertt ............... A63F 13/213 463/31 |
| 2012/0315987 A1 | 12/2012 | Walling |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1 | 4/2013 | Gupta |
| 2013/0104053 A1 | 4/2013 | Thornton et al. |
| 2013/0110631 A1 | 5/2013 | Mitchell et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0152000 A1 | 6/2013 | Liu et al. |
| 2013/0155169 A1 | 6/2013 | Hoover et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0174059 A1 | 7/2013 | Van Wie et al. |
| 2013/0179520 A1 | 7/2013 | Lee et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1 | 1/2014 | Barbalet et al. |
| 2014/0019264 A1 | 1/2014 | Wachman et al. |
| 2014/0032682 A1 | 1/2014 | Prado et al. |
| 2014/0040066 A1 | 2/2014 | Fujioka |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0085293 A1 | 3/2014 | Konoplev et al. |
| 2014/0092130 A1 | 4/2014 | Anderson et al. |
| 2014/0095293 A1 | 4/2014 | Abhyanker |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0128166 A1 | 5/2014 | Tam et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0176662 A1 | 6/2014 | Goodman |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280058 A1 | 9/2014 | St. Clair |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289216 A1 | 9/2014 | Voellmer et al. |
| 2014/0289833 A1 | 9/2014 | Briceno |
| 2014/0306884 A1 | 10/2014 | Sano et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |

(56) References Cited

U.S. PATENT DOCUMENTS

| | | |
|---|---|---|
| 2014/0347368 A1 | 11/2014 | Kishore et al. |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2015/0020086 A1 | 1/2015 | Chen et al. |
| 2015/0046278 A1 | 2/2015 | Pei et al. |
| 2015/0067880 A1 | 3/2015 | Ward et al. |
| 2015/0071619 A1 | 3/2015 | Brough |
| 2015/0084984 A1 | 3/2015 | Tomii et al. |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0121251 A1 | 4/2015 | Kadirvel et al. |
| 2015/0123967 A1 | 5/2015 | Quinn et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0193522 A1 | 7/2015 | Choi et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0245168 A1 | 8/2015 | Martin |
| 2015/0261917 A1 | 9/2015 | Smith |
| 2015/0264432 A1 | 9/2015 | Cheng |
| 2015/0279098 A1 | 10/2015 | Kim et al. |
| 2015/0295866 A1 | 10/2015 | Collet et al. |
| 2015/0304806 A1 | 10/2015 | Vincent |
| 2015/0312184 A1 | 10/2015 | Langholz et al. |
| 2015/0334077 A1 | 11/2015 | Feldman |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0021153 A1 | 1/2016 | Hull et al. |
| 2016/0045834 A1 | 2/2016 | Burns |
| 2016/0050169 A1 | 2/2016 | Ben et al. |
| 2016/0078095 A1 | 3/2016 | Man et al. |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0093078 A1 | 3/2016 | Davis et al. |
| 2016/0099901 A1 | 4/2016 | Allen et al. |
| 2016/0110922 A1 | 4/2016 | Haring |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0179297 A1 | 6/2016 | Lundin et al. |
| 2016/0180391 A1 | 6/2016 | Zabaneh |
| 2016/0180447 A1 | 6/2016 | Kamalie et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'kane |
| 2016/0210500 A1 | 7/2016 | Feng et al. |
| 2016/0217292 A1 | 7/2016 | Faaborg et al. |
| 2016/0234149 A1 | 8/2016 | Tsuda et al. |
| 2016/0239248 A1 | 8/2016 | Sehn |
| 2016/0241504 A1 | 8/2016 | Raji et al. |
| 2016/0253807 A1 | 9/2016 | Jones et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0321708 A1 | 11/2016 | Sehn |
| 2016/0343160 A1 | 11/2016 | Blattner et al. |
| 2016/0350297 A1 | 12/2016 | Riza |
| 2016/0357578 A1 | 12/2016 | Kim et al. |
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2016/0379415 A1 | 12/2016 | Espeset et al. |
| 2017/0006094 A1 | 1/2017 | Abou Mahmoud et al. |
| 2017/0006322 A1 | 1/2017 | Dury et al. |
| 2017/0027528 A1 | 2/2017 | Kaleal, III et al. |
| 2017/0034173 A1 | 2/2017 | Miller et al. |
| 2017/0039752 A1 | 2/2017 | Quinn et al. |
| 2017/0061308 A1 | 3/2017 | Chen et al. |
| 2017/0064240 A1 | 3/2017 | Mangat et al. |
| 2017/0069124 A1 | 3/2017 | Tong et al. |
| 2017/0076011 A1 | 3/2017 | Gannon |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0124116 A1 | 5/2017 | League |
| 2017/0126592 A1 | 5/2017 | El |
| 2017/0132649 A1 | 5/2017 | Oliva et al. |
| 2017/0161382 A1 | 6/2017 | Ouimet et al. |
| 2017/0199855 A1 | 7/2017 | Fishbeck |
| 2017/0235848 A1 | 8/2017 | Van et al. |
| 2017/0263029 A1 | 9/2017 | Yan et al. |
| 2017/0270970 A1 | 9/2017 | Ho et al. |
| 2017/0286752 A1* | 10/2017 | Gusarov ............... G06T 13/40 |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0344807 A1* | 11/2017 | Jillela ............... G06V 40/166 |
| 2017/0352179 A1 | 12/2017 | Hardee et al. |
| 2017/0353477 A1 | 12/2017 | Faigon et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'hara et al. |
| 2018/0060363 A1 | 3/2018 | Ko et al. |
| 2018/0068019 A1 | 3/2018 | Novikoff et al. |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0352150 A1* | 12/2018 | Purwar ............... H04N 5/445 |
| 2018/0373924 A1* | 12/2018 | Yoo ............... G06K 9/6262 |

(56) References Cited

U.S. PATENT DOCUMENTS

| | | | |
|---|---|---|---|
| 2018/0374242 A1 | 12/2018 | Li et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0188920 A1 | 6/2019 | Mcphee et al. | |
| 2019/0220932 A1 | 7/2019 | Amitay et al. | |
| 2019/0266390 A1 | 8/2019 | Gusarov et al. | |
| 2019/0287287 A1 | 9/2019 | Bondich et al. | |
| 2019/0332851 A1* | 10/2019 | Han | G06V 10/22 |
| 2019/0386941 A1 | 12/2019 | Baldwin et al. | |
| 2020/0117339 A1 | 4/2020 | Amitay et al. | |
| 2020/0117340 A1 | 4/2020 | Amitay et al. | |
| 2020/0120097 A1 | 4/2020 | Amitay et al. | |
| 2020/0120170 A1 | 4/2020 | Amitay et al. | |
| 2021/0027513 A1* | 1/2021 | Choi | G06V 10/25 |
| 2021/0266277 A1 | 8/2021 | Allen et al. | |
| 2022/0270322 A1* | 8/2022 | Huang | G06T 7/11 |

FOREIGN PATENT DOCUMENTS

| | | |
|---|---|---|
| CN | 102985951 | 3/2013 |
| CN | 104782120 | 7/2015 |
| CN | 105359162 | 2/2016 |
| CN | 105409197 | 3/2016 |
| CN | 108885795 A | 11/2018 |
| CN | 109643370 A | 4/2019 |
| CN | 109863532 A | 6/2019 |
| CN | 110023985 A | 7/2019 |
| CN | 110168478 A | 8/2019 |
| CN | 110799937 A | 2/2020 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| EP | 2051480 A1 | 4/2009 |
| EP | 2151797 A1 | 2/2010 |
| EP | 2184092 A2 | 5/2010 |
| GB | 2399928 A | 9/2004 |
| JP | 2001230801 A | 8/2001 |
| JP | 2014006881 A | 1/2014 |
| JP | 5497931 B2 | 3/2014 |
| KR | 19990073076 A | 10/1999 |
| KR | 20000063919 A | 11/2000 |
| KR | 20010078417 A | 8/2001 |
| KR | 20040063436 A | 7/2004 |
| KR | 1020050036963 A | 4/2005 |
| KR | 20070008417 A | 1/2007 |
| KR | 1020120070898 A | 7/2012 |
| KR | 20140033088 A | 3/2014 |
| KR | 101445263 B1 | 9/2014 |
| KR | 20160016532 A | 2/2016 |
| KR | 20160028028 A | 3/2016 |
| KR | 20160051536 A | 5/2016 |
| KR | 20170091803 A | 8/2017 |
| KR | 102233700 B1 | 3/2021 |
| KR | 102335138 | 12/2021 |
| KR | 102459610 | 10/2022 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2012139276 A1 | 10/2012 |
| WO | WO-2013008238 A1 | 1/2013 |
| WO | WO-2013008251 A2 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017173319 A1 | 10/2017 |
| WO | WO-2017176739 A1 | 10/2017 |
| WO | WO-2017176992 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2018200042 A1 | 11/2018 |
| WO | WO-2018200043 A1 | 11/2018 |
| WO | WO-2018201102 A1 | 11/2018 |
| WO | WO-2018201104 A1 | 11/2018 |
| WO | WO-2018201106 A1 | 11/2018 |
| WO | WO-2018201107 A1 | 11/2018 |
| WO | WO-2018201108 A1 | 11/2018 |
| WO | WO-2018201109 A1 | 11/2018 |
| WO | WO-2019089613 A1 | 5/2019 |

OTHER PUBLICATIONS

"U.S. Appl. No. 16/115,259, Response filed Feb. 8, 2022 to Non Final Office Action dated Nov. 8, 2021", 9 pgs.

"Korean Application Serial No. 10-2021-7039311, Notice of Preliminary Rejection dated Jan. 24, 2022", wi English Translation, 11 pgs.

"Chinese Application Serial No. 201780022014.5, Office Action dated Dec. 22, 2021", w/ English Translation, 13 pgs.

"Korean Application Serial No. 10-2021-7039311, Response Filed Feb. 23, 2022 to Notice of Preliminary Rejection dated Jan. 24, 2022", w/ English Claims, 24 pgs.

"U.S. Appl. No. 16/115,259, Final Office Action dated Apr. 4, 2022", 18 pgs.

"U.S. Appl. No. 17/314,963, Response filed May 2, 2022 to Non Final Office Action dated Feb. 2, 2022", 10 pgs.

"Chinese Application Serial No. 201780022014.5, Response filed May 6, 2022 to Office Action filed Dec. 22, 2021", w/ English Claims, 15 pgs.

"U.S. Appl. No. 12/471,811, Advisory Action dated Mar. 28, 2012", 6 pgs.

"U.S. Appl. No. 12/471,811, Examiner Interview Summary dated Feb. 2, 2012", 3 pgs.

"U.S. Appl. No. 12/471,811, Examiner Interview Summary dated Apr. 18, 2011", 3 pgs.

"U.S. Appl. No. 12/471,811, Examiner Interview Summary dated May 27, 2014", 2 pgs.

"U.S. Appl. No. 12/471,811, Final Office Action dated Dec. 23, 2011", 20 pgs.

"U.S. Appl. No. 12/471,811, Non Final Office Action dated Jan. 13, 2011", 15 pgs.

"U.S. Appl. No. 12/471,811, Non Final Office Action dated Jun. 28, 2011", 26 pgs.

(56) References Cited

OTHER PUBLICATIONS

"U.S. Appl. No. 12/471,811, Non Final Office Action dated Oct. 24, 2014", 21 pgs.
"U.S. Appl. No. 12/471,811, Notice of Allowance dated Apr. 1, 2015", 6 pgs.
"U.S. Appl. No. 12/471,811, Response filed Jan. 26, 2015 to Non Final Office Action dated Oct. 24, 2014", 18 pgs.
"U.S. Appl. No. 12/471,811, Response filed Feb. 23, 2012 to Final Office Action dated Dec. 23, 2011", 12 pgs.
"U.S. Appl. No. 12/471,811, Response filed Mar. 28, 2012 to Advisory Action dated Mar. 28, 2012", 14 pgs.
"U.S. Appl. No. 12/471,811, Response filed Apr. 13, 2011 to Non Final Office Action dated Jan. 13, 2011", 5 pgs.
"U.S. Appl. No. 12/471,811, Response filed Sep. 28, 2011 to Non Final Office Action dated Jun. 28, 2011", 19 pgs.
"U.S. Appl. No. 13/979,974, Corrected Notice of Allowability dated Nov. 19, 2018", 2 pgs.
"U.S. Appl. No. 13/979,974, Examiner Interview Summary dated Jun. 29, 2017", 3 pgs.
"U.S. Appl. No. 13/979,974, Examiner Interview Summary dated Sep. 15, 2017", 3 pgs.
"U.S. Appl. No. 13/979,974, Final Office Action dated Apr. 25, 2018", 18 pgs.
"U.S. Appl. No. 13/979,974, Final Office Action dated Jun. 9, 2017", 20 pgs.
"U.S. Appl. No. 13/979,974, Final Office Action dated Oct. 12, 2016", 13 pgs.
"U.S. Appl. No. 13/979,974, Non Final Office Action dated Feb. 22, 2017", 17 pgs.
"U.S. Appl. No. 13/979,974, Non Final Office Action dated Apr. 27, 2016", 16 pgs.
"U.S. Appl. No. 13/979,974, Non Final Office Action dated Oct. 3, 2017", 17 pgs.
"U.S. Appl. No. 13/979,974, Notice of Allowance dated Aug. 10, 2018", 9 pgs.
"U.S. Appl. No. 13/979,974, Response filed Jan. 3, 2018 to Non Final Office Action dated Oct. 3, 2017", 8 pgs.
"U.S. Appl. No. 13/979,974, Response filed May 22, 2017 to Non Final Office Action dated Feb. 22, 2017", 10 pgs.
"U.S. Appl. No. 13/979,974, Response filed Jul. 25, 2018 to Final Office Action dated Apr. 25, 2018", 10 pgs.
"U.S. Appl. No. 13/979,974, Response filed Jul. 26, 2016 to Non Final Office Action dated Apr. 27, 2016", 8 pgs.
"U.S. Appl. No. 13/979,974, Response filed Sep. 11, 2017 to Final Office Action dated Jun. 9, 2017", 8 pgs.
"U.S. Appl. No. 13/979,974, Response filed Jan. 12, 2017 to Non Final Office Action dated Apr. 27, 2016", 8 pgs.
"U.S. Appl. No. 14/753,200, Non Final Office Action dated Oct. 11, 2016", 6 pgs.
"U.S. Appl. No. 14/753,200, Notice of Allowance dated Apr. 27, 2017", 7 pgs.
"U.S. Appl. No. 14/753,200, Response filed Feb. 13, 2017 to Non Final Office Action dated Oct. 11, 2016", 9 pgs.
"U.S. Appl. No. 15/086,749, Final Office Action dated Oct. 31, 2017", 15 pgs.
"U.S. Appl. No. 15/086,749, Final Office Action dated Dec. 31, 2018", 14 pgs.
"U.S. Appl. No. 15/086,749, Non Final Office Action dated Mar. 13, 2017", 12 pgs.
"U.S. Appl. No. 15/086,749, Non Final Office Action dated Apr. 30, 2018", 14 pgs.
"U.S. Appl. No. 15/086,749, Notice of Allowance dated Feb. 26, 2019", 7 pgs.
"U.S. Appl. No. 15/086,749, Response filed Feb. 11, 2019 to Final Office Action dated Dec. 31, 2018", 10 pgs.
"U.S. Appl. No. 15/086,749, Response filed Apr. 2, 2018 to Final Office Action dated Oct. 31, 2017", 14 pgs.
"U.S. Appl. No. 15/086,749, Response filed Aug. 29, 2018 to Non Final Office Action dated Apr. 30, 2018", 12 pgs.
"U.S. Appl. No. 15/199,472, Final Office Action dated Mar. 1, 2018", 31 pgs.
"U.S. Appl. No. 15/199,472, Final Office Action dated Nov. 15, 2018", 37 pgs.
"U.S. Appl. No. 15/199,472, Non Final Office Action dated Jul. 25, 2017", 30 pgs.
"U.S. Appl. No. 15/199,472, Non Final Office Action dated Sep. 21, 2018", 33 pgs.
"U.S. Appl. No. 15/199,472, Notice of Allowance dated Mar. 18, 2019", 23 pgs.
"U.S. Appl. No. 15/199,472, Response filed Jan. 15, 2019 to Final Office Action dated Nov. 15, 2018", 14 pgs.
"U.S. Appl. No. 15/199,472, Response filed Jan. 25, 2018 to Non Final Office Action dated Jul. 25, 2017", 13 pgs.
"U.S. Appl. No. 15/199,472, Response filed Aug. 31, 2018 to Final Office Action dated Mar. 1, 2018", 14 pgs.
"U.S. Appl. No. 15/199,472, Response filed Oct. 17, 2018 to Non Final Office Action dated Sep. 31, 2018", 11 pgs.
"U.S. Appl. No. 15/365,046, Non Final Office Action dated Dec. 20, 2018", 36 pgs.
"U.S. Appl. No. 15/365,046, Response filed Mar. 20, 2019 to Non Final Office Action dated Dec. 20, 2018", 20 pgs.
"U.S. Appl. No. 15/369,499, Examiner Interview Summary dated Sep. 21, 2020", 3 pgs.
"U.S. Appl. No. 15/369,499, Examiner Interview Summary dated Oct. 9, 2020", 2 pgs.
"U.S. Appl. No. 15/369,499, Final Office Action dated Jan. 31, 2019", 22 pgs.
"U.S. Appl. No. 15/369,499, Final Office Action dated Jun. 15, 2020", 17 pgs.
"U.S. Appl. No. 15/369,499, Final Office Action dated Oct. 1, 2019", 17 pgs.
"U.S. Appl. No. 15/369,499, Non Final Office Action dated Mar. 2, 2020", 17 pgs.
"U.S. Appl. No. 15/369,499, Non Final Office Action dated Jun. 17, 2019", 17 pgs.
"U.S. Appl. No. 15/369,499, Non Final Office Action dated Aug. 15, 2018", 22 pgs.
"U.S. Appl. No. 15/369,499, Notice of Allowance dated Oct. 26, 2020", 17 pgs.
"U.S. Appl. No. 15/369,499, Response filed Feb. 3, 2020 to Final Office Action dated Oct. 1, 2019", 10 pgs.
"U.S. Appl. No. 15/369,499, Response filed Mar. 14, 2019 to Final Office Action dated Jan. 31, 2019", 12 pgs.
"U.S. Appl. No. 15/369,499, Response filed Jun. 2, 2020 to Non Final Office Action dated Mar. 2, 2020", 9 pgs.
"U.S. Appl. No. 15/369,499, Response filed Sep. 15, 2020 to Final Office Action dated Jun. 15, 2020", 10 pgs.
"U.S. Appl. No. 15/369,499, Response filed Nov. 15, 2018 to Non Final Office Action dated Aug. 15, 2018", 10 pgs.
"U.S. Appl. No. 15/369,499, Response filed Sep. 10, 2019 to Non-Final Office Action dated Jun. 17, 2019", 9 pgs.
"U.S. Appl. No. 15/401,926, Restriction Requirement dated Mar. 29, 2019", 7 pgs.
"U.S. Appl. No. 15/583,142, Jan. 28, 2019 to Response Filed Non Final Office Action dated Oct. 25, 2018", 19 pgs.
"U.S. Appl. No. 15/583,142, Final Office Action dated Mar. 22, 2019", 11 pgs.
"U.S. Appl. No. 15/583,142, Non Final Office Action dated Oct. 25, 2018", 14 pgs.
"U.S. Appl. No. 15/628,408, Non Final Office Action dated Jan. 2, 2019", 28 pgs.
"U.S. Appl. No. 15/628,408, Response filed Apr. 2, 2019 to Non Final Office Action dated Jan. 2, 2019", 15 pgs.
"U.S. Appl. No. 15/628,408, Supplemental Amendment filed Apr. 4, 2019 to Non Final Office Action dated Jan. 2, 2019", 12 pgs.
"U.S. Appl. No. 15/661,953, Examiner Interview Summary dated Nov. 13, 2018", 3 pgs.
"U.S. Appl. No. 15/661,953, Non Final Office Action dated Mar. 26, 2018", 6 pgs.
"U.S. Appl. No. 15/661,953, Notice of Allowance dated Aug. 10, 2018", 7 pgs.

(56) References Cited

OTHER PUBLICATIONS

"U.S. Appl. No. 15/661,953, PTO Response to Rule 312 Communication dated Oct. 30, 2018", 2 pgs.
"U.S. Appl. No. 15/661,953, PTO Response to Rule 312 CommunicationNov. 7, 2018", 2 pgs.
"U.S. Appl. No. 15/661,953, Response Filed Jun. 26, 2018 to Non Final Office Action dated Mar. 26, 2018", 13 pgs.
"U.S. Appl. No. 16/115,259, Final Office Action dated Jul. 22, 2020", 20 pgs.
"U.S. Appl. No. 16/115,259, Final Office Action dated Dec. 16, 2019", 23 pgs.
"U.S. Appl. No. 16/115,259, Non Final Office Action dated Apr. 9, 2020", 18 pgs.
"U.S. Appl. No. 16/115,259, Non Final Office Action dated Jul. 30, 2019", 21 pgs.
"U.S. Appl. No. 16/115,259, Preliminary Amendment filed Oct. 18, 2018 t", 6 pgs.
"U.S. Appl. No. 16/115,259, Response filed Mar. 13, 2020 to Final Office Action dated Dec. 16, 2019", 9 pgs.
"U.S. Appl. No. 16/115,259, Response filed Jul. 9, 2020 to Non Final Office Action dated Apr. 9, 2020", 8 pgs.
"U.S. Appl. No. 16/115,259, Response filed Oct. 22, 2020 to Final Office Action dated Jul. 22, 2020", 10 pgs.
"U.S. Appl. No. 16/115,259, Response filed Oct. 30, 2019 to Non Final Office Action dated Jul. 30, 2019", 9 pgs.
"U.S. Appl. No. 16/193,938, Preliminary Amendment filed Nov. 27, 2018", 7 pgs.
"U.S. Appl. No. 16/409,390, Corrected Notice of Allowability dated May 19, 2021", 4 pgs.
"U.S. Appl. No. 16/409,390, Final Office Action dated Jun. 15, 2020", 12 pgs.
"U.S. Appl. No. 16/409,390, Final Office Action dated Dec. 23, 2020", 15 pgs.
"U.S. Appl. No. 16/409,390, Non Final Office Action dated Jan. 8, 2020", 14 pgs.
"U.S. Appl. No. 16/409,390, Non Final Office Action dated Sep. 11, 2020", 15 pgs.
"U.S. Appl. No. 16/409,390, Notice of Allowance dated Feb. 22, 2021", 7 pgs.
"U.S. Appl. No. 16/409,390, Response filed Feb. 8, 2021 to Final Office Action dated Dec. 23, 2020", 11 pgs.
"U.S. Appl. No. 16/409,390, Response filed Apr. 2, 2020 to Non Final Office Action dated Jan. 8, 2020", 10 pgs.
"U.S. Appl. No. 16/409,390, Response filed Aug. 5, 2020 to Final Office Action dated Jun. 15, 2020", 11 pgs.
"U.S. Appl. No. 16/409,390, Response filed Dec. 8, 2020 to Non Final Office Action dated Sep. 11, 2020", 12 pgs.
"European Application Serial No. 17776809.0, Communication Pursuant to Article 94(3) EPC dated Apr. 23, 2021", 4 pgs.
"European Application Serial No. 17776809.0, Communication Pursuant to Article 94(3) EPC dated Dec. 9, 2019", 4 pgs.
"European Application Serial No. 17776809.0, Extended European Search Report dated Feb. 27, 2019", 7 pgs.
"European Application Serial No. 17776809.0, Response filed Mar. 19, 2020 to Communication Pursuant to Article 94(3) EPC dated Dec. 9, 2019", 25 pgs.
"International Application Serial No. PCT/CA2013/000454, International Preliminary Report on Patentability dated Nov. 20, 2014", 9 pgs.
"International Application Serial No. PCT/CA2013/000454, International Search Report dated Aug. 20, 2013", 3 pgs.
"International Application Serial No. PCT/CA2013/000454, Written Opinion dated Aug. 20, 2013", 7 pgs.
"International Application Serial No. PCT/US2017/025460, International Preliminary Report on Patentability dated Oct. 11, 2018", 9 pgs.
"International Application Serial No. PCT/US2017/025460, International Search Report dated Jun. 20, 2017", 2 pgs.
"International Application Serial No. PCT/US2017/025460, Written Opinion dated Jun. 20, 2017", 7 pgs.
"International Application Serial No. PCT/US2017/040447, International Preliminary Report on Patentability dated Jan. 10, 2019", 8 pgs.
"International Application Serial No. PCT/US2017/040447, International Search Report dated Oct. 2, 2017", 4 pgs.
"International Application Serial No. PCT/US2017/040447, Written Opinion dated Oct. 2, 2017", 6 pgs.
"International Application Serial No. PCT/US2017/057918, International Search Report dated Jan. 19, 2018", 3 pgs.
"International Application Serial No. PCT/US2017/057918, Written Opinion dated Jan. 19, 2018", 7 pgs.
"International Application Serial No. PCT/US2017/063981, International Search Report dated Mar. 22, 2018", 3 pgs.
"International Application Serial No. PCT/US2017/063981, Written Opinion dated Mar. 22, 2018", 8 pgs.
"International Application Serial No. PCT/US2018/000112, International Search Report dated Jul. 20, 2018", 2 pgs.
"International Application Serial No. PCT/US2018/000112, Written Opinion dated Jul. 20, 2018", 4 pgs.
"International Application Serial No. PCT/US2018/000113, International Search Report dated Jul. 13, 2018", 2 pgs.
"International Application Serial No. PCT/US2018/000113, Written Opinion dated Jul. 13, 2018", 4 pgs.
"International Application Serial No. PCT/US2018/030039, International Search Report dated Jul. 11, 2018", 2 pgs.
"International Application Serial No. PCT/US2018/030039, Written Opinion dated Jul. 11, 2018", 4 pgs.
"International Application Serial No. PCT/US2018/030043, International Search Report dated Jul. 23, 2018", 2 pgs.
"International Application Serial No. PCT/US2018/030043, Written Opinion dated Jul. 23, 2018", 5 pgs.
"International Application Serial No. PCT/US2018/030044, International Search Report dated Jun. 26, 2018", 2 pgs.
"International Application Serial No. PCT/US2018/030044, Written Opinion dated Jun. 26, 2018", 6 pgs.
"International Application Serial No. PCT/US2018/030045, International Search Report dated Jul. 3, 2018", 2 pgs.
"International Application Serial No. PCT/US2018/030045, Written Opinion dated Jul. 3, 2018", 6 pgs.
"International Application Serial No. PCT/US2018/030046, International Search Report dated Jul. 6, 2018", 2 pgs.
"International Application Serial No. PCT/US2018/030046, Written Opinion dated Jul. 6, 2018", 6 pgs.
"Korean Application Serial No. 10-2018-7031055, Notice of Preliminary Rejection dated Aug. 6, 2019", w/ English Translation, 13 pgs.
"Korean Application Serial No. 10-2018-7031055, Office Action dated Feb. 25, 2020", w/ English Translation, 7 pgs.
"Korean Application Serial No. 10-2018-7031055, Response filed Mar. 27, 2020 to Office Action dated Feb. 25, 2020", w/ English claims, 24 pgs.
"Korean Application Serial No. 10-2020-7022773, Notice of Preliminary Rejection dated Feb. 26, 2021", w/ English Translation, 11 pgs.
"Korean Application Serial No. 10-2020-7022773, Notice of Preliminary Rejection dated Aug. 23, 2020", w/ English translation, 11 pgs.
"Korean Application Serial No. 10-2020-7022773, Response filed Oct. 19, 2020 to Notice of Preliminary Rejection dated Aug. 23, 2020", w/ English Claims, 26 pgs.
"List of IBM Patents or Patent Applications Treated as Related; {Appendix P}", IBM, (Sep. 14, 2018), 2 pgs.
Broderick, Ryan, "Every thing You Need to Know About Japan's Amazing Photo Booths", [Online] Retrieved from the Internet: <URL: https://www.buzzfeed.com/ryanhatesthis/look-how-kawaii-i-am?utm_term-.kra5QwGNZ#.muYoVB7qJ>, (Jan. 22, 2016), 30 pgs.
Chan, Connie, "The Elements of Stickers", [Online] Retrieved from the Internet: <URL: https://a16z.com/2016/06/17/stickers/>, (Jun. 20, 2016), 15 pgs.
Collet, Jean Luc, et al., "Interactive avatar in messaging environment", U.S. Appl. No. 12/471,811, filed May 26, 2009, (May 26, 2009), 31 pgs.

(56) References Cited

OTHER PUBLICATIONS

Dillet, Romain, "Zenly proves that location sharing isn't dead", [Online] Retrieved from the Internet: <URL: https://techcrunch.com/2016/05/19/zenly-solomoyolo/>, (accessed Jun. 27, 2018), 6 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Petovello, Mark, "How does a GNSS receiver estimate velocity?", InsideGNSS, [Online] Retrieved from the Internet: <URL: http://insidegnss.com/wp-content/uploads/2018/01/marapr15-SOLUTIONS.pdf>., (Mar.-Apr. 2015), 3 pgs.

Rhee, Chi-Hyoung, et al., "Cartoon-like Avatar Generation Using Facial Component Matching", International Journal of Multimedia and Ubiquitous Engineering, (Jul. 30, 2013), 69-78.

"A Guide to Advertising on Campus With Snapchat Geofilters", College Marketing Group, [Online] Retrieved from the Internet: <URL: https://collegemarketinggroup.com/blog/a-guide-toadvertising-on-campus-with-snapchat-geofilters/>, (Jul. 25, 2016), 5 pgs.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/199,472, Notice of Allowability dated May 13, 2019", 3 pgs.

"U.S. Appl. No. 15/365,046, Notice of Allowance dated May 21, 2019", 14 pgs.

"U.S. Appl. No. 15/369,499, Corrected Notice of Allowability dated Jan. 28, 2021", 3 pgs.

"U.S. Appl. No. 15/401,926, Advisory Action dated Mar. 11, 2020", 2 pgs.

"U.S. Appl. No. 15/401,926, Final Office Action dated Feb. 12, 2021", 10 pgs.

"U.S. Appl. No. 15/401,926, Final Office Action dated Nov. 21, 2019", 9 pgs.

"U.S. Appl. No. 15/401,926, Non Final Office Action dated Mar. 30, 2020", 9 pgs.

"U.S. Appl. No. 15/401,926, Non Final Office Action dated Aug. 6, 2019", 9 pgs.

"U.S. Appl. No. 15/401,926, Non Final Office Action dated Oct. 27, 2020", 10 pgs.

"U.S. Appl. No. 15/401,926, Response filed Jan. 27, 2021 to Non Final Office Action dated Oct. 27, 2020", 9 pgs.

"U.S. Appl. No. 15/401,926, Response filed Feb. 21, 2020 to Final Office Action dated Nov. 21, 2019", 9 pgs.

"U.S. Appl. No. 15/401,926, Response filed May 12, 2021 to Final Office Action dated Feb. 12, 2021", 9 pgs.

"U.S. Appl. No. 15/401,926, Response filed May 20, 2019 to Restriction Requirement dated Mar. 29, 2019", 9 pgs.

"U.S. Appl. No. 15/401,926, Response filed Jul. 30, 2020 to Non Final Office Action dated Mar. 30, 2020", 10 pgs.

"U.S. Appl. No. 15/401,926, Response filed Nov. 6, 2019 to Non Final Office Action dated Aug. 6, 2019", 10 pgs.

"U.S. Appl. No. 15/583,142, Notice of Allowance dated Jun. 6, 2019", 8 pgs.

"U.S. Appl. No. 15/583,142, Response filed May 9, 2019 to Final Office Action dated Mar. 22, 2019", 8 pgs.

"U.S. Appl. No. 15/628,408, Final Office Action dated Apr. 13, 2020", 45 pgs.

"U.S. Appl. No. 15/628,408, Final Office Action dated Jun. 10, 2019", 44 pgs.

"U.S. Appl. No. 15/628,408, Non Final Office Action dated Oct. 30, 2019", 45 pgs.

"U.S. Appl. No. 15/628,408, Notice of Allowance dated Sep. 29, 2020", 13 pgs.

"U.S. Appl. No. 15/628,408, Response filed Jan. 30, 2020 to Non Final Office Action dated Oct. 30, 2019", 17 pgs.

"U.S. Appl. No. 15/628,408, Response filed Jul. 13, 2020 to Final Office Action dated Apr. 13, 2020", 20 pgs.

"U.S. Appl. No. 15/628,408, Response filed Aug. 12, 2019 to Final Office Action dated Jun. 10, 2019", 12 pgs.

"U.S. Appl. No. 15/859,101, Examiner Interview Summary dated Sep. 18, 2018", 3 pgs.

"U.S. Appl. No. 15/859,101, Non Final Office Action dated Jun. 15, 2018", 10 pgs.

"U.S. Appl. No. 15/859,101, Notice of Allowance dated Oct. 4, 2018", 9 pgs.

"U.S. Appl. No. 15/859,101, Response filed Sep. 17, 2018 to Non Final Office Action dated Jun. 15, 2018", 17 pgs.

"U.S. Appl. No. 15/901,387, Non Final Office Action dated Oct. 30, 2019", 40 pgs.

"U.S. Appl. No. 15/965,361, Non Final Office Action dated Jun. 22, 2020", 35 pgs.

"U.S. Appl. No. 15/965,744, Examiner Interview Summary dated Feb. 21, 2020", 3 pgs.

"U.S. Appl. No. 15/965,744, Final Office Action dated Feb. 6, 2020", 19 pgs.

"U.S. Appl. No. 15/965,744, Non Final Office Action dated Feb. 1, 2021", 29 pgs.

"U.S. Appl. No. 15/965,744, Non Final Office Action dated Jun. 12, 2019", 18 pgs.

"U.S. Appl. No. 15/965,744, Response filed Jun. 8, 2020 to Final Office Action dated Feb. 6, 2020", 11 pgs.

"U.S. Appl. No. 15/965,744, Response filed Nov. 12, 2019 to Non Final Office Action dated Jun. 12, 2019", 10 pgs.

"U.S. Appl. No. 15/965,749, Examiner Interview Summary dated Jul. 29, 2020", 3 pgs.

"U.S. Appl. No. 15/965,749, Final Office Action dated Jun. 11, 2020", 12 pgs.

"U.S. Appl. No. 15/965,749, Non Final Office Action dated Jan. 27, 2020", 9 pgs.

"U.S. Appl. No. 15/965,749, Non Final Office Action dated Jul. 10, 2019", 8 pgs.

"U.S. Appl. No. 15/965,749, Non Final Office Action dated Nov. 30, 2020", 13 pgs.

"U.S. Appl. No. 15/965,749, Response filed Feb. 28, 2020 to Non Final Office Action dated Jan. 27, 2020", 12 pgs.

"U.S. Appl. No. 15/965,749, Response filed Oct. 10, 2019 to Non-Final Office Action dated Jul. 10, 2019", 11 pgs.

"U.S. Appl. No. 15/965,749, Response filed Oct. 12, 2020 to Final Office Action dated Jun. 11, 2020", 14 pgs.

"U.S. Appl. No. 15/965,754, Corrected Notice of Allowability dated Jan. 6, 2021", 2 pgs.

"U.S. Appl. No. 15/965,754, Corrected Notice of Allowability dated Mar. 1, 2021", 2 pgs.

"U.S. Appl. No. 15/965,754, Final Office Action dated Jul. 17, 2020", 14 pgs.

"U.S. Appl. No. 15/965,754, Non Final Office Action dated Mar. 30, 2020", 13 pgs.

"U.S. Appl. No. 15/965,754, Notice of Allowance dated Nov. 16, 2020", 7 pgs.

"U.S. Appl. No. 15/965,754, Response filed Jun. 30, 2020 to Non Final Office Action dated Mar. 30, 2020", 12 pgs.

"U.S. Appl. No. 15/965,754, Response filed Oct. 19, 2020 to Final Office Action dated Jul. 17, 2020", 14 pgs.

"U.S. Appl. No. 15/965,754, Supplemental Notice of Allowability dated Dec. 16, 2020", 2 pgs.

"U.S. Appl. No. 15/965,756, Non Final Office Action dated Jan. 13, 2021", 16 pgs.

"U.S. Appl. No. 15/965,756, Non Final Office Action dated Jun. 24, 2020", 16 pgs.

"U.S. Appl. No. 15/965,756, Response filed Sep. 24, 2020 to Non Final Office Action dated Jun. 24, 2020", 11 pgs.

"U.S. Appl. No. 15/965,764, Examiner Interview Summary dated Aug. 6, 2020", 3 pgs.

"U.S. Appl. No. 15/965,764, Final Office Action dated May 14, 2020", 18 pgs.

"U.S. Appl. No. 15/965,764, Non Final Office Action dated Jan. 2, 2020", 18 pgs.

(56) References Cited

OTHER PUBLICATIONS

"U.S. Appl. No. 15/965,764, Non Final Office Action dated Feb. 22, 2021", 18 pgs.
"U.S. Appl. No. 15/965,764, Response filed Apr. 2, 2020 to Non Final Office Action dated Jan. 2, 2020", 11 pgs.
"U.S. Appl. No. 15/965,764, Response filed Oct. 14, 2020 to Final Office Action dated May 14, 2020", 11 pgs.
"U.S. Appl. No. 15/965,775, Final Office Action dated Jan. 30, 2020", 10 pgs.
"U.S. Appl. No. 15/965,775, Non Final Office Action dated Jun. 19, 2020", 12 pgs.
"U.S. Appl. No. 15/965,775, Non Final Office Action dated Jul. 29, 2019", 8 pgs.
"U.S. Appl. No. 15/965,775, Non Final Office Action dated Oct. 16, 2020", 11 pgs.
"U.S. Appl. No. 15/965,775, Response filed Mar. 16, 2021 to Non Final Office Action dated Oct. 16, 2020", 10 pgs.
"U.S. Appl. No. 15/965,775, Response filed Jun. 1, 2020 to Final Office Action dated Jan. 30, 2020", 10 pgs.
"U.S. Appl. No. 15/965,775, Response filed Jul. 7, 2020 to Non Final Office Action dated Jun. 19, 2020", 9 pgs.
"U.S. Appl. No. 15/965,775, Response filed Oct. 29, 2019 to Non Final Office Action dated Jul. 29, 2019", 10 pgs.
"U.S. Appl. No. 15/965,811, Final Office Action dated Feb. 12, 2020", 16 pgs.
"U.S. Appl. No. 15/965,811, Non Final Office Action dated Jun. 26, 2020", 20 pgs.
"U.S. Appl. No. 15/965,811, Non Final Office Action dated Aug. 8, 2019", 15 pgs.
"U.S. Appl. No. 15/965,811, Response filed Jun. 12, 2020 to Final Office Action dated Feb. 12, 2020", 13 pgs.
"U.S. Appl. No. 15/965,811, Response filed Nov. 8, 2019 to Non Final Office Action dated Aug. 8, 2019", 14 pgs.
"U.S. Appl. No. 16/115,259, Final Office Action dated Jul. 13, 2021", 18 pgs.
"U.S. Appl. No. 16/115,259, Non Final Office Action dated Jan. 11, 2021", 17 pgs.
"U.S. Appl. No. 16/115,259, Non Final Office Action dated Nov. 8, 2021", 17 pgs.
"U.S. Appl. No. 16/115,259, Response filed May 11, 2021 to Non Final Office Action dated Jan. 11, 2021", 14 pgs.
"U.S. Appl. No. 16/115,259, Response filed Oct. 13, 2021 to Final Office Action dated Jul. 13, 2021", 10 pgs.
"U.S. Appl. No. 16/126,869, Final Office Action dated Feb. 8, 2021", 8 pgs.
"U.S. Appl. No. 16/126,869, Final Office Action dated Jul. 7, 2020", 8 pgs.
"U.S. Appl. No. 16/126,869, Non Final Office Action dated Feb. 5, 2020", 7 pgs.
"U.S. Appl. No. 16/126,869, Non Final Office Action dated May 19, 2021", 8 pgs.
"U.S. Appl. No. 16/126,869, Non Final Office Action dated Oct. 30, 2020", 9 pgs.
"U.S. Appl. No. 16/126,869, Response filed Feb. 1, 2021 to Non Final Office Action dated Oct. 30, 2020", 9 pgs.
"U.S. Appl. No. 16/126,869, Response filed May 5, 2020 to Non Final Office Action dated Feb. 5, 2020", 8 pgs.
"U.S. Appl. No. 16/126,869, Response filed May 10, 2021 to Final Office Action dated Feb. 8, 2021", 10 pgs.
"U.S. Appl. No. 16/126,869, Response filed Oct. 7, 2020 to Final Office Action dated Jul. 7, 2020", 10 pgs.
"U.S. Appl. No. 16/193,938, Final Office Action dated Aug. 28, 2020", 10 pgs.
"U.S. Appl. No. 16/193,938, Non Final Office Action dated Jan. 16, 2020", 11 pgs.
"U.S. Appl. No. 16/193,938, Non Final Office Action dated Feb. 24, 2021", 10 pgs.
"U.S. Appl. No. 16/193,938, Response filed Mar. 24, 2020 to Non Final Office Action dated Jan. 16, 2020", 10 pgs.
"U.S. Appl. No. 16/193,938, Response filed Nov. 30, 2020 to Final Office Action dated Aug. 28, 2020", 9 pgs.
"U.S. Appl. No. 16/232,824, Examiner Interview Summary dated Jul. 24, 2020", 3 pgs.
"U.S. Appl. No. 16/232,824, Final Office Action dated Apr. 30, 2020", 19 pgs.
"U.S. Appl. No. 16/232,824, Non Final Office Action dated Feb. 19, 2021", 28 pgs.
"U.S. Appl. No. 16/232,824, Non Final Office Action dated Oct. 21, 2019", 18 pgs.
"U.S. Appl. No. 16/232,824, Response filed Feb. 21, 2020 to Non Final Office Action dated Oct. 21, 2019", 9 pgs.
"U.S. Appl. No. 16/232,824, Response filed Jul. 15, 2020 to Final Office Action dated Apr. 30, 2020", 11 pgs.
"U.S. Appl. No. 16/245,660, Final Office Action dated Feb. 6, 2020", 12 pgs.
"U.S. Appl. No. 16/245,660, Non Final Office Action dated Jun. 27, 2019", 11 pgs.
"U.S. Appl. No. 16/245,660, Notice of Allowability dated Nov. 18, 2020", 2 pgs.
"U.S. Appl. No. 16/245,660, Notice of Allowance dated Jul. 8, 2020", 8 pgs.
"U.S. Appl. No. 16/245,660, Notice of Allowance dated Nov. 3, 2020", 8 pgs.
"U.S. Appl. No. 16/245,660, Response filed Jun. 8, 2020 to Final Office Action dated Feb. 6, 2020", 16 pgs.
"U.S. Appl. No. 16/245,660, Response filed Nov. 6, 2019 to Non Final Office Action dated Jun. 27, 2019", 11 pgs.
"U.S. Appl. No. 16/365,300, Final Office Action dated Apr. 15, 2021", 31 pgs.
"U.S. Appl. No. 16/365,300, Final Office Action dated May 13, 2020", 44 pgs.
"U.S. Appl. No. 16/365,300, Non Final Office Action dated Sep. 28, 2020", 40 pgs.
"U.S. Appl. No. 16/365,300, Non Final Office Action dated Oct. 30, 2019", 40 pgs.
"U.S. Appl. No. 16/365,300, Response filed Jan. 28, 2021 to Non Final Office Action dated Sep. 28, 2020", 17 pgs.
"U.S. Appl. No. 16/365,300, Response filed Jan. 30, 2020 to Non Final Office Action dated Oct. 30, 2019", 16 pgs.
"U.S. Appl. No. 16/365,300, Response filed Aug. 13, 2020 to Final Office Action dated May 13, 2020", 16 pgs.
"U.S. Appl. No. 16/433,725, Examiner Interview Summary dated Jul. 20, 2020", 4 pgs.
"U.S. Appl. No. 16/433,725, Final Office Action dated Jun. 2, 2020", 29 pgs.
"U.S. Appl. No. 16/433,725, Non Final Office Action dated Feb. 27, 2020", 34 pgs.
"U.S. Appl. No. 16/433,725, Non Final Office Action dated Aug. 20, 2020", 29 pgs.
"U.S. Appl. No. 16/433,725, Notice of Allowance dated Dec. 16, 2020", 8 pgs.
"U.S. Appl. No. 16/433,725, Response filed May 8, 2020 to Non Final Office Action dated Feb. 27, 2020", 13 pgs.
"U.S. Appl. No. 16/433,725, Response filed Aug. 3, 2020 to Final Office Action dated Jun. 2, 2020", 12 pgs.
"U.S. Appl. No. 16/433,725, Response filed Nov. 16, 2020 to Non Final Office Action dated Aug. 20, 2020", 12 pgs.
"U.S. Appl. No. 16/433,725, Supplemental Notice of Allowability dated Jan. 25, 2021", 2 pgs.
"U.S. Appl. No. 16/552,003, Notice of Allowance dated Aug. 27, 2020", 15 pgs.
"U.S. Appl. No. 16/563,445, Final Office Action dated Mar. 8, 2021", 11 pgs.
"U.S. Appl. No. 16/563,445, Non Final Office Action dated Sep. 29, 2020", 11 pgs.
"U.S. Appl. No. 16/563,445, Response filed Jan. 29, 2021 to Non Final Office Action dated Sep. 29, 2020", 9 pgs.
"U.S. Appl. No. 17/247,169, Preliminary Amendment filed Feb. 2, 2021", 7 pgs.
"BlogStomp", StompSoftware, [Online] Retrieved from the Internet: <URL: http://stompsoftware.com/blogstomp>, (accessed May 24, 2017), 12 pgs.

(56) References Cited

OTHER PUBLICATIONS

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"European Application Serial No. 19206595.1, Extended European Search Report dated Mar. 31, 2020", 6 pgs.

"European Application Serial No. 17751497.3, Response filed May 20, 2019 to Communication pursuant to Rules 161(1) and 162 EPC dated Feb. 14, 2019", w/ English Claims, 24 pgs.

"European Application Serial No. 17776809.0, Response filed Aug. 20, 2021 to Communication Pursuant to Article 94(3) EPC dated Apr. 23, 2021", 7 pgs.

"European Application Serial No. 17876226.6, Communication Pursuant to Article 94(3) EPC dated May 29, 2020", 5 pgs.

"European Application Serial No. 17876226.6, Extended European Search Report dated Sep. 5, 2019", 10 pgs.

"European Application Serial No. 17876226.6, Response filed Mar. 30, 2020 to Extended European Search Report dated Sep. 5, 2019", 22 pgs.

"European Application Serial No. 17876226.6, Response filed Oct. 2, 2020 to Communication Pursuant to Article 94(3) EPC dated May 29, 2020", 22 pgs.

"European Application Serial No. 18789872.1, Communication Pursuant to Article 94(3) EPC dated Aug. 11, 2020", 6 pgs.

"European Application Serial No. 18789872.1, Extended European Search Report dated Jan. 2, 2020", 8 pgs.

"European Application Serial No. 18789872.1, Response filed Feb. 18, 2021 to Communication Pursuant to Article 94(3) EPC dated Aug. 11, 2020", 15 pgs.

"European Application Serial No. 18790189.7, Communication Pursuant to Article 94(3) EPC dated Jul. 30, 2020", 9 pgs.

"European Application Serial No. 18790189.7, Extended European Search Report dated Jan. 2, 2020", 7 pgs.

"European Application Serial No. 18790189.7, Response filed Feb. 9, 2021 to Communication Pursuant to Article 94(3) EPC dated Jul. 30, 2020", 11 pgs.

"European Application Serial No. 18790189.7, Response Filed Jul. 14, 2020 to Extended European Search Report dated Jan. 2, 2020", 21 pgs.

"European Application Serial No. 18790319.0, Extended European Search Report dated Feb. 12, 2020", 6 pgs.

"European Application Serial No. 18790319.0, Response filed Aug. 27, 2020 to Extended European Search Report dated Feb. 12, 2020", 19 pgs.

"European Application Serial No. 18791363.7, Communication Pursuant to Article 94(3) EPC dated Aug. 11, 2020", 9 pgs.

"European Application Serial No. 18791363.7, Extended European Search Report dated Jan. 2, 2020", 8 pgs.

"European Application Serial No. 18791363.7, Response filed Jul. 14, 2020 to Extended European Search Report dated Jan. 2, 2020", 31 pgs.

"European Application Serial No. 18791925.3, Communication Pursuant to Article 94(3) EPC dated May 11, 2021", 7 pgs.

"European Application Serial No. 18791925.3, Extended European Search Report dated Jan. 2, 2020", 6 pgs.

"European Application Serial No. 18791925.3, Response Filed Jul. 27, 2020 to Extended European Search Report dated Jan. 2, 2020", 19 pgs.

"European Application Serial No. 19206595.1, Response filed Dec. 16, 2020 to Extended European Search Report dated Mar. 31, 2020", 43 pgs.

"European Application Serial No. 19206610.8, Extended European Search Report dated Feb. 12, 2020", 6 pgs.

"European Application Serial No. 19206610.8, Response filed Sep. 23, 2020 to Extended European Search Report dated Feb. 12, 2020", 109 pgs.

"InstaPlace Photo App Tell the Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"International Application Serial No. PCT/US2017/057918, International Preliminary Report on Patentability dated May 9, 2019", 9 pgs.

"International Application Serial No. PCT/US2017/063981, International Preliminary Report on Patentability dated Jun. 13, 2019", 10 pgs.

"International Application Serial No. PCT/US2018/000112, International Preliminary Report on Patentability dated Nov. 7, 2019", 6 pgs.

"International Application Serial No. PCT/US2018/000113, International Preliminary Report on Patentability dated Nov. 7, 2019", 6 pgs.

"International Application Serial No. PCT/US2018/030039, International Preliminary Report on Patentability dated Nov. 7, 2019", 6 pgs.

"International Application Serial No. PCT/US2018/030041, International Preliminary Report on Patentability dated Nov. 7, 2019", 5 pgs.

"International Application Serial No. PCT/US2018/030041, International Search Report dated Jul. 11, 2018", 2 pgs.

"International Application Serial No. PCT/US2018/030041, Written Opinion dated Jul. 11, 2018", 3 pgs.

"International Application Serial No. PCT/US2018/030043, International Preliminary Report on Patentability dated Nov. 7, 2019", 7 pgs.

"International Application Serial No. PCT/US2018/030044, International Preliminary Report on Patentability dated Nov. 7, 2019", 8 pgs.

"International Application Serial No. PCT/US2018/030045, International Preliminary Report on Patentability dated Nov. 7, 2019", 8 pgs.

"International Application Serial No. PCT/US2018/030046, International Preliminary Report on Patentability dated Nov. 7, 2019", 8 pgs.

"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Korean Application Serial No. 10-2018-7031055, Response filed Oct. 7, 2019 to Notice of Preliminary Rejection dated Aug. 6, 2019", w/ English Claims, 30 pgs.

"Korean Application Serial No. 10-2019-7002736, Final Office Action dated Nov. 26, 2020", w/ English Translation, 8 pgs.

"Korean Application Serial No. 10-2019-7002736, Notice of Preliminary Rejection dated May 25, 2020", W/English Translation, 16 pgs.

"Korean Application Serial No. 10-2019-7002736, Response filed Jul. 9, 2020 to Notice of Preliminary Rejection dated May 25, 2020", w/ English Claims, 29 pgs.

"Korean Application Serial No. 10-2019-7002736, Response filed Dec. 28, 2020 to Final Office Action dated Nov. 26, 2020", w/ English Claims, 16 pgs.

"Korean Application Serial No. 10-2019-7014555, Notice of Preliminary Rejection dated Jul. 20, 2020", w/ English Translation, 12 pgs.

"Korean Application Serial No. 10-2019-7014555, Response filed Oct. 6, 2020 to Notice of Preliminary Rejection dated Jul. 20, 2020", w/ English Claims, 27 pgs.

"Korean Application Serial No. 10-2019-7018501, Final Office Action dated Sep. 8, 2020", w/ English translation, 9 pgs.

"Korean Application Serial No. 10-2019-7018501, Notice of Preliminary Rejection dated Apr. 16, 2020", w/ English Translation, 20 pgs.

(56) References Cited

OTHER PUBLICATIONS

"Korean Application Serial No. 10-2019-7018501, Response filed Jun. 16, 2020 to Notice of Preliminary Rejection dated Apr. 16, 2020", w/ English Claims, 17 pgs.
"Korean Application Serial No. 10-2019-7018501, Response filed Dec. 7, 2020 to Final Office Action dated Sep. 8, 2020", w/ English Claims, 27 pgs.
"Korean Application Serial No. 10-2020-7022773, Response filed Apr. 7, 2021 to Notice of Preliminary Rejection dated Feb. 26, 2021", w/ English Claims, 12 pgs.
"Korean Application Serial No. 10-2020-7035136, Notice of Preliminary Rejection dated Feb. 25, 2021", w/ English Translation, 5 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"The One Million Tweet Map: Using Maptimize to Visualize Tweets in a World Map | PowerPoint Presentation", fppt.com, [Online] Retrieved form the Internet: <URL: https://web.archive.org/web/20121103231906/http://www.freepower-point-templates.com/articles/the-one-million-tweet-mapusing-maptimize-to-visualize-tweets-in-a-world-map/>, (Nov. 3, 2012), 6 pgs.
Alex, Heath, "What do Snapchat's emojis mean?—Understanding these emojis will turn you into a Snapchat pro", Business Insider, [Online] Retrieved from the Internet: <URL: https://www.businessinsider.com/what-do-snapchats-emojismean-2016-5?international=true&r=US&IR=T>, (May 28, 2016), 1 pg.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Finn, Greg, "Miss Google Latitude? Google Plus With Location Sharing Is Now a Suitable Alternative", Cypress North, [Online] Retrieved from the Internet: <URL: https://cypressnorth.com/social-media/miss-google-latitude-google-location-sharing-now-suitable-alternative/>, [Retrieved on: Oct. 24, 2019], (Nov. 27, 2013), 10 pgs.
Gundersen, Eric, "Foursquare Switches to MapBox Streets, Joins the OpenStreetMap Movement", [Online] Retrieved from the Internet: <URL: https://blog.mapbox.com/foursquare-switches-to-mapbox-streets-joins-the-openstreetmap-movement-29e6a17f4464>, (Mar. 6, 2012), 4 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Karen, Tumbokon, "Snapchat Update: How to Add Bitmoji to Customizable Geofilters", International Business Times, [Online] Retrieved from the Internet : <URL: https://www.ibtimes.com/snapchat-update-how-add-bitmojicustomizable-geofilters-2448152>, (Nov. 18, 2016), 6 pgs.
Lapenna, Joe, "The Official Google Blog. Check in with Google Latitude", Google Blog, [Online] Retrieved from the Internet: <https://web.archive.org/web/20110201201006/https://googleblog.blogspot.com/2011/02/check-in-with-google-latitude.html>, [Retrieved on: Oct. 23, 2019], (Feb. 1, 2011), 6 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Neis, Pascal, "The OpenStreetMap Contributors Map aka Who's around me?", [Online] Retrieved from the Internet by the examiner on Jun. 5, 2019: <URL: https://neis-one.org/2013/01/oooc/>, (Jan. 6, 2013), 7 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Perez, Sarah, "Life 360, The Family Locator With More Users Than Foursquare, Raises a $10 Million Series B", [Online] Retrieved from the Internet: <URL: https://techcrunch.com/2013/07/10/life360-the-family-locator-with-more-users-than-foursquare-raises-10-million-series-b/>, (Jul. 10, 2013), 2 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Sophia, Bernazzani, "A Brief History of Snapchat", Hubspot, [Online] Retrieved from the Internet : <URL: https://blog.hubspot.com/marketing/history-of-snapchat>, (Feb. 10, 2017), 12 pgs.
Sulleyman, Aatif, "Google Maps Could Let Strangers Track Your Real-Time Location for Days at a Time", The Independent, [Online] Retrieved from the Internet: <URL: https://www.independent.co.uk/life-style/gadgets-and-tech/news/google-maps-track-location-real-time-days-privacy-security-stalk-gps-days-a7645721.html>, (Mar. 23, 2017), 5 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.
U.S. Appl. No. 15/086,749, U.S. Pat. No. 10,339,365, filed Mar. 31, 2016, Automated Avatar Generation.
U.S. Appl. No. 16/409,390, U.S. Pat. No. 11,048,916, filed May 10, 2019, Automated Avatar Generation.

(56) References Cited

OTHER PUBLICATIONS

U.S. Appl. No. 15/369,499, U.S. Pat. No. 10,938,758, filed Dec. 5, 2016, Generating and Displaying Customized Avatars in Media Overlays.
U.S. Appl. No. 17/314,963, filed May 7, 2021, Generating and Displaying Customized Avatars in Media Overlays.
U.S. Appl. No. 16/115,259, filed Aug. 28, 2018, Generating and Displaying Customized Avatars in Media Overlays.
"U.S. Appl. No. 17/314,963, Final Office Action dated Jul. 11, 2022", 25 pgs.
"U.S. Appl. No. 16/115,259, Response filed Sep. 6, 2022 to Final Office Action dated Apr. 4, 2022", 10 pgs.
"U.S. Appl. No. 17/314,963, Response filed Sep. 12, 2022 to Final Office Action dated Jul. 11, 2022", 11 pgs.
"U.S. Appl. No. 17/314,963, Advisory Action dated Sep. 27, 2022", 3 pgs.
"U.S. Appl. No. 17/314,963, Response filed Oct. 11, 2022 to Advisory Action dated Sep. 27, 2022", 10 pgs.
"U.S. Appl. No. 16/115,259, Non Final Office Action dated Nov. 1, 2022", 18 pgs.
"Chinese Application Serial No. 201780022014.5, Decision of Rejection dated Sep. 28, 2022", w English Translation, 10 pgs.

\* cited by examiner

AUTOMATED AVATAR GENERATION

PRIORITY

This application is a continuation of and claims the benefit of priority of U.S. patent application Ser. No. 16/409,390, filed on May 10, 2019, which is a continuation of and claims the benefit of priority of U.S. patent application Ser. No. 15/086,749, filed on Mar. 31, 2016, each of which is hereby incorporated by reference herein in their entireties.

TECHNICAL FIELD

Embodiments of the present disclosure relate generally to automate processing of images. More particularly, but not by way of limitation, the present disclosure addresses systems and methods for generating representations of a face depicted within a set of images.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Currently avatars used for communication or identification purposes are often generated entirely by user selection. Avatars generated using some automation often rely on user selection of initial elements as an underlying baseline for predetermined matching operations to complete the avatar.

BRIEF DESCRIPTION OF THE DRAWINGS

Various ones of the appended drawings merely illustrate example embodiments of the present disclosure and should not be considered as limiting its scope.

Figure 1:
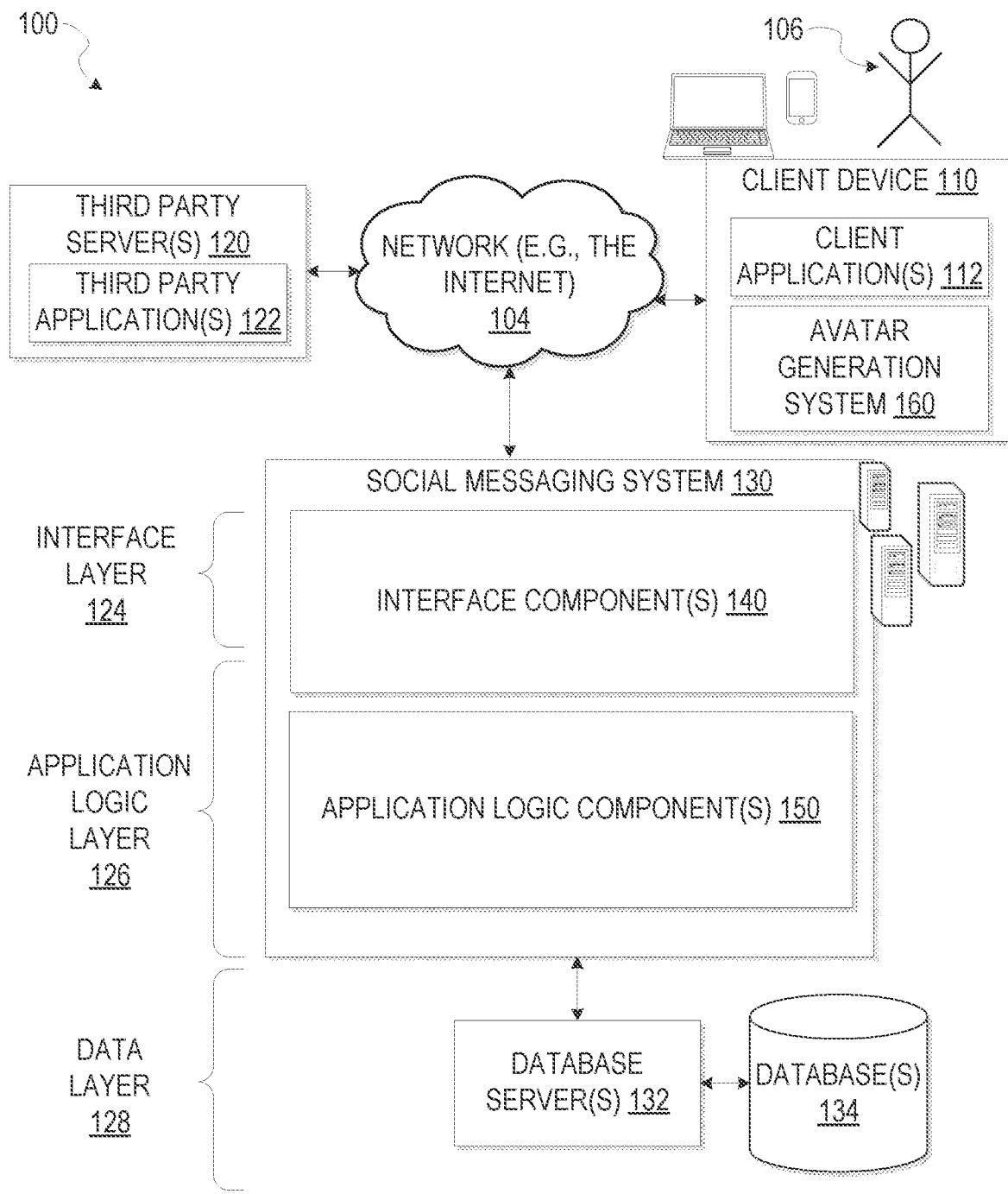
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although methods exist to generate avatars or representations of faces within an image, most of these methods do not employ facial recognition or facial landmarks as a basis for the generated avatar or representation of the face. Often, where an image is used by a machine to generate an avatar or facial representation, the machine selects solely from a set of templates to approximate the face depicted within the image. Further, machine generated facial representations from images are often computationally intensive and still require user input and selection prior to, during, and after the generation process to produce the facial representation. Accordingly, there is still a need in the art to improve generation of avatars and facial representations without user interaction or with minimal user interaction. Further, there is still a need in the art to improve generation of stylized (e.g., animated and cartoon image) avatars which are reasonable facsimiles of a face depicted within an image using facial landmarks derived from the face and measurements generated based on the facial landmarks. As described herein, methods and systems are presented for generating facial representations or avatars based on facial landmarks of a face depicted within an image using a single user interaction of an initial selection.

Embodiments of the present disclosure may relate generally to automated image segmentation and generation of facial representations based on the segmented image. In one embodiment, a user of a client device may open an application operating on the client device. Selection of a user interface element by the user causes capture of an image using a camera of the client device. The user may then select a "generate avatar" button within the application to cause the application to build an avatar using the captured image. The application may identify facial landmarks, measurements between facial landmarks, and characteristics of the face to generate a look-alike avatar based on the image and proportions of the face. After generating the avatar, the application may present buttons enabling the user to save the avatar, manipulate or customize the avatar, generate another avatar, and generate additional graphics using the avatar.

The additional graphics may include digital stickers, emojis, animated bitmap images, and other graphics which may be shared with other users by including the graphics in messages or other communications between client devices.

The above is one specific example. The various embodiments of the present disclosure relate to devices and instructions by one or more processors of a device to modify an image or a video stream transmitted by the device to another device while the video stream is being captured (e.g., modifying a video stream in real time). An avatar generation system is described that identifies and tracks objects and areas of interest within an image or across a video stream and through a set of images comprising the video stream. In various example embodiments, the avatar generation system identifies and tracks one or more facial features depicted in a video stream or within an image and performs image recognition, facial recognition, and facial processing functions with respect to the one or more facial features and interrelations between two or more facial features.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an avatar generation system 160 such that components of the avatar generation system 160 configure the client device 110 to perform a specific set of functions with respect to operations of the avatar generation system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the avatar generation system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the avatar generation system 160 capable of identifying, tracking, and modifying video data during capture of the video data by the client device 110. Similarly, the client device 110 includes a portion of the avatar generation system 160, as described above. In other examples, client device 110 may include the entirety of avatar generation system 160. In instances where the client device 110 includes a portion of (or all of) the avatar generation system 160, the client device 110 can work alone or in cooperation with the social messaging system 130 to provide the functionality of the avatar generation system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the avatar generation system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
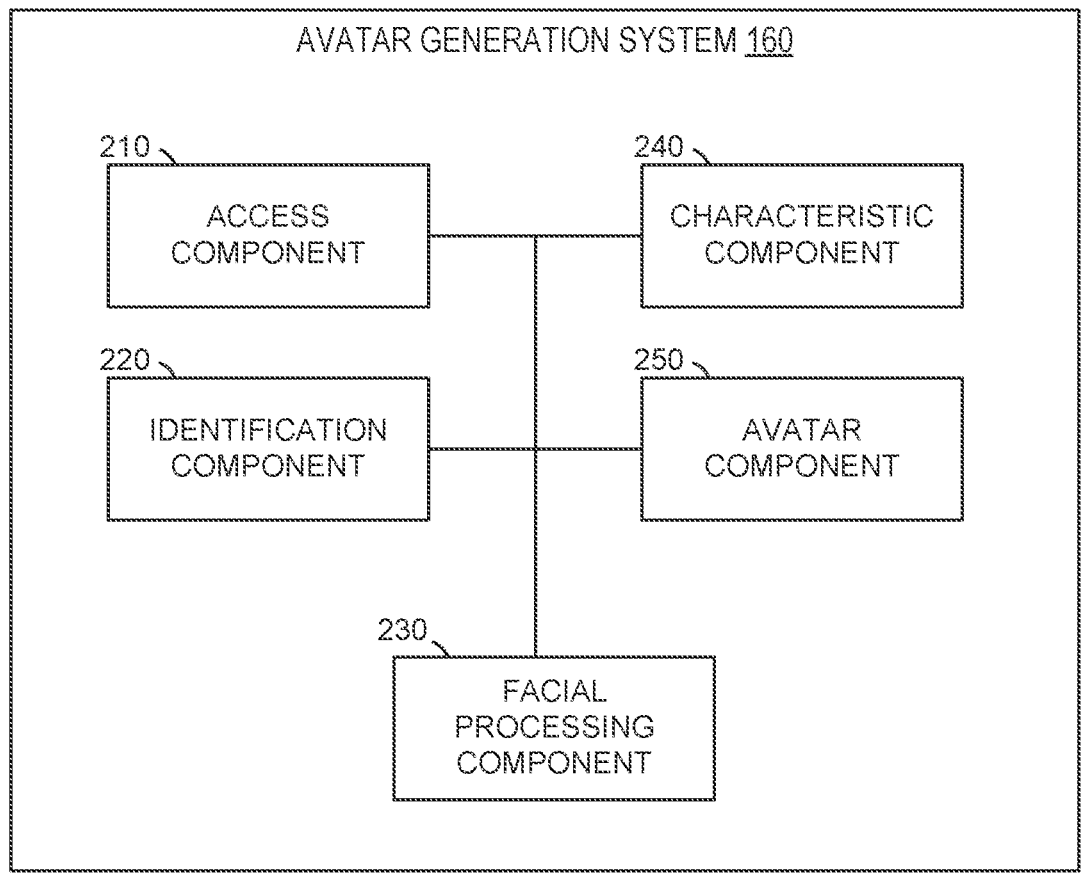
FIG. 2 is a diagram illustrating an avatar generation system, according to some example embodiments.

In FIG. 2, in various embodiments, the avatar generation system 160 can be implemented as a standalone system or implemented in conjunction with the client device 110, and is not necessarily included in the social messaging system 130. The avatar generation system 160 is shown to include an access component 210, an identification component 220, a facial processing component 230, a characteristic component 240, and an avatar component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

The access component 210 accesses or otherwise retrieves images captured by an image capture device or otherwise received by or stored in the client device 110. In some instances, the access component 210 may include portions or all of an image capture component configured to cause an image capture device of the client device 110 to capture images based on user interaction with a user interface presented on a display device of the client device 110. The access component 210 may pass images or portions of images to one or more other components of the avatar generation system 160.

The identification component 220 identifies faces or other areas of interest within the image or set of images received from the access component 210. In some embodiments, the identification component 220 tracks the identified face or areas of interest across multiple images of a set of images (e.g., a video stream). The identification component 220 may pass values (e.g., coordinates within the image or portions of the image) representing the face or areas of interest to one or more components of the avatar generation system 160.

The facial processing component 230 identifies facial landmarks depicted on the face or within the areas of interest identified by the identification component 220. In some embodiments, the facial processing component 230 identifies expected but missing facial landmarks in addition to the facial landmarks which are depicted on the face or within the area of interest. The facial processing component 230 may determine an orientation of the face based on the facial landmarks and may identify one or more relationships between the facial landmarks. The facial processing component 230 may pass values representing the facial landmarks to one or more components of the avatar generation system 160.

The characteristic component 240 identifies, determines, or measures one or more characteristics of the face within the image or areas of interest based at least in part on the facial landmarks identified by the facial processing component 230. In some embodiments, the characteristic component 240 identifies facial features based on the facial landmarks. The characteristic component 240 may determine measurements of the identified facial features and distances extending between two or more facial features. In some embodiments, the characteristic component 240 identifies areas of interest and extracts prevailing colors from the areas of interest identified on the face. The characteristic component 240 may pass values representing the one or more characteristics to the avatar component 250.

The avatar component 250 generates an avatar or facial representation based on the one or more characteristics received from the characteristic component 240. In some embodiments, the avatar component 250 generates a stylized representation of the face, such as a cartoon version of the face depicted within the image. The stylized representation may be generated such that the proportions, positions, and prevailing colors of the features identified within the face are matched to the stylized representation. In some embodiments, in order to match the proportions, positions, and prevailing colors, the avatar component 250 independently generates facial feature representations or modifies existing template representations to match the characteristics and facial features identified by the characteristic component 240. The avatar component 250 may cause presentation of the finished avatar of facial representation at a display device of the client device 110. In some embodiments, the avatar component 250 enables generation of graphics using the generated avatar or facial representation such as stickers, emojis, .gifs, and other suitable graphics configured for transmission within a message (e.g., text, short message system messages, instant messages, and temporary messages) to a subsequent client device associated with a subsequent user.

Figure 3:
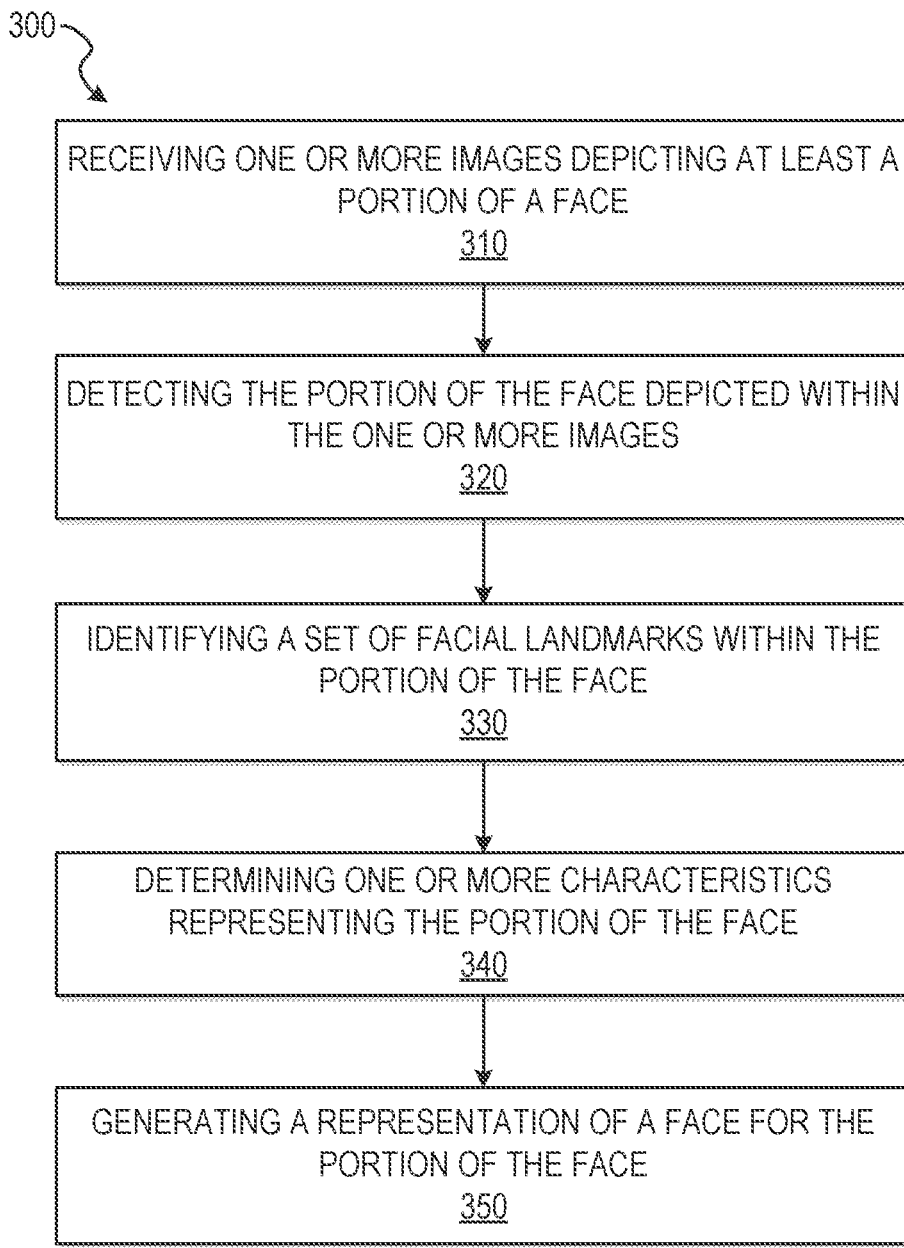
FIG. 3 is a flow diagram illustrating an example method for segmenting an image to generate a representation of a portion of the image, according to some example embodiments.

FIG. 3 depicts a flow diagram illustrating an example method 300 for generating representations of a face from a set of images (e.g., a video stream). The operations of method 300 may be performed by components of the avatar generation system 160, and are so described below for purposes of illustration.

In operation 310, the access component 210 receives or otherwise accesses one or more images depicting at least a portion of a face. In some embodiments, the access component 210 receives the one or more images as a video stream captured by an image captured device associated with the client device 110 and presented on a user interface of an avatar generation application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the avatar generation system 160, as described below in more detail.

In operation 320, the identification component 220 detects the portion of the face depicted within the one or more images. In some embodiments, the identification component 220 includes a set of face tracking operations to identify a face or a portion of a face within the one or more images. The identification component 220 may use the Viola-Jones object detection framework, eigen-face technique, a genetic algorithm for face detection, edge detection methods, or any other suitable object-class detection method or set of operations to identify the face or portion of the face within the one or more images. Where the one or more images are a plurality of images (e.g., a set of images in a video stream) the face tracking operations of the identification component 220, after identifying the face or portion of the face in an initial image, may identify changes in position of the face across multiple images of the plurality of images, thereby tracking movement of the face within the plurality of images. Although specific techniques are described, it should be understood that the identification component 220 may use any suitable technique or set of operations to identify the face or portion of the face within the one or more images without departing from the scope of the present disclosure.

In operation 330, the facial processing component 230 identifies a set of facial landmarks within the portion of the face depicted within the one or more images. In some embodiments, the facial processing component 230 identifies the set of facial landmarks within the portion of the face in a subset of the one or more images. For example, the facial processing component 230 may identify the set of facial landmarks in a set of images (e.g., a first set of images) of a plurality of images, where the portion of the face or the facial landmarks appear in the set of images but not in the remaining images of the plurality of images (e.g., a second set of images). In some embodiments, identification of the facial landmarks may be performed as a sub-operation or part of identification of the face or portion of the face using face tracking operations incorporating the detection operations described above.

In operation 340, the characteristic component 240 determines one or more characteristics representing the portion of the face depicted in the one or more images. In some embodiments, the operation 340 is performed in response to detecting the portion of the face, in the operation 320, and the set of facial landmarks, in the operation 330. Characteristics representing the portion of the face may include presence or absence of one or more features (e.g., an eye, an eyebrow, a nose, a mouth, and a perimeter of a face) depicted on the portion of the face, relative positions of the one or more features (e.g., positions of features relative to one another or relative to an outline of the portion of the face), measuring portions of the one or more features, and measuring distances between the two or more of the features. In some instances, characteristics of the portion of the face include color of the one or more features depicted on the face, relative color between an area of the portion of the face and one or more features depicted on the portion of the face, presence or absence of an obstruction, presence or absence of hair, presence or absence of a shadow, or any other suitable characteristics of the portion of the face.

In operation 350, the avatar component 250 generates a representation of a face for the at least one portion of the face depicted in the one or more images. In some embodiments, the operation 350 is performed based on (e.g., in response to) the one or more characteristics being determined in the operation 340 and the set of facial landmarks being identified in the operation 330. Where the characteristics include one or more measurements for the one or more features depicted on the portion of the face, the avatar component 250 may generate the representation of the face by rendering a base face and head shape according to the characteristics and the one or more measurements. The avatar component 250 may then generate the one or more features depicted on the face and apply the one or more generated features to the base face and head shape. Each of the one or more features may be generated to match one or more measurements associated with the specified feature.

In some embodiments, the avatar component 250 may generate one or more features by matching the one or more features to a feature included in a set of example features. The avatar component 250 may select the feature included in the set. After selection of the feature, the avatar component 250 may apply the selected feature to the base face and head shape. In some instances, the avatar component 250 generates the representation of the face using a combination of generating representations of the one or more features and selecting one or more features from the set of example features.

In some instances, the avatar component 250 may generate one or more graphics using the generated avatar or facial representation. For example, the avatar component 250 may generate the graphics (e.g., sticker or emoji) by inserting a scaled version of the avatar into a template graphic. The avatar component 250 may present graphic templates to the user for selection, such that a user selection causes the avatar component 250 to generate the graphic by inserting the avatar into a predetermined position and dimension of the graphic template. In some instances, the avatar component 250 may generate animated (e.g., moving) graphics for the avatar. The animated graphics may be generated based on generating a plurality of avatars (e.g., avatars presented at different angles or positions) for a set of images forming a video stream. In these embodiments, the animated graphic may be a series of generated avatars presented in succession to form an animation. In some instances, the avatar component 250 may generate the animated graphic from a single generated avatar.

Figure 4:
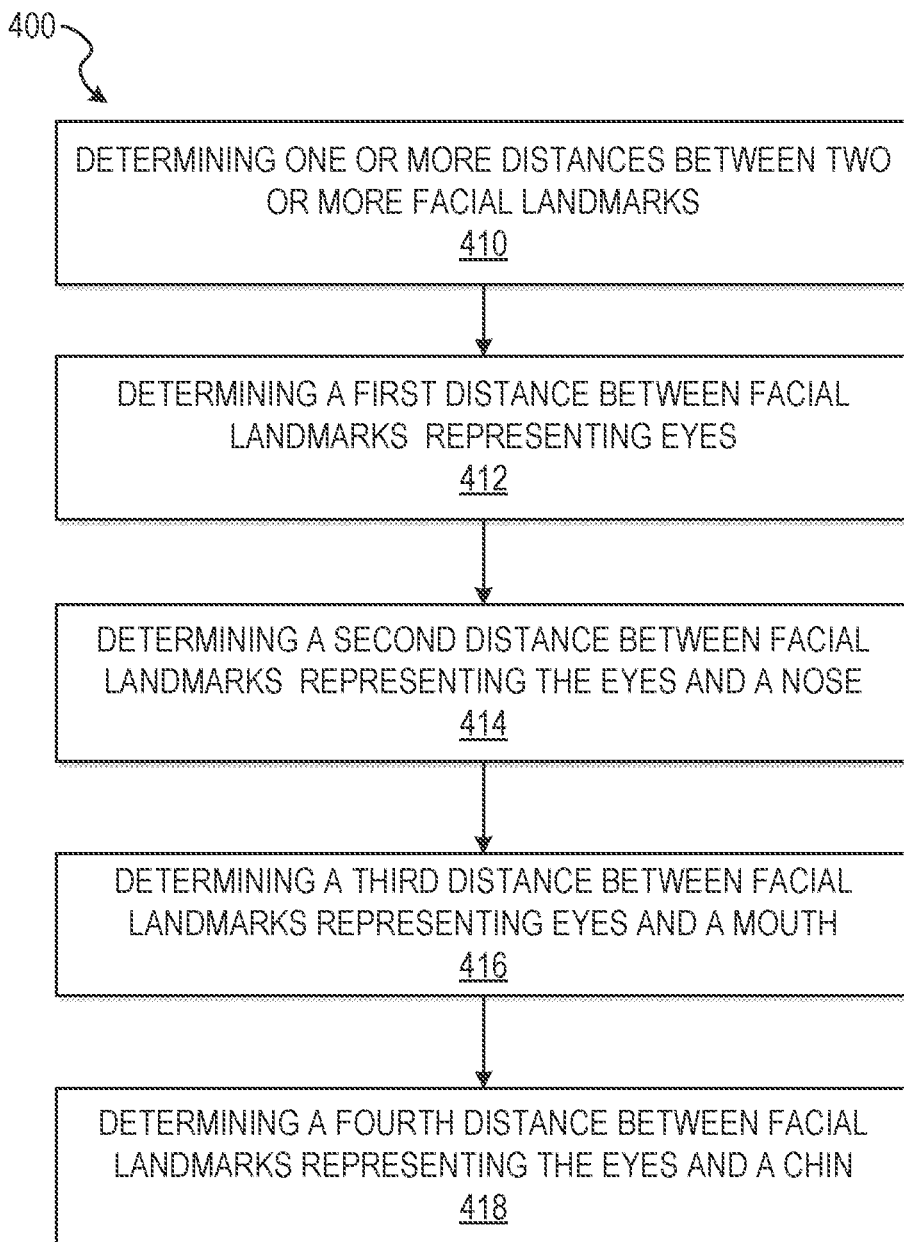
FIG. 4 is a flow diagram illustrating an example method for segmenting an image to generate a representation of a portion of the image, according to some example embodiments.

FIG. 4 shows a flow diagram illustrating an example method 400 for generating representations of a face from a set of images. The operations of method 400 may be performed by components of the avatar generation system 160. In some instances, certain operations of the method 400 may be performed using one or more operations of the method 300 or as sub-operations of one or more operations of the method 300, as will be explained in more detail below.

In operation 410 the facial processing component 230 determines one or more distances between two or more facial landmarks. In some embodiments, the operation 410 is performed as part of or in response to performance of the operation 330. The one or more distances may be measured or determined as pixel distances, actual distances, or relative distances. The facial processing component 230 may identify the two or more facial landmarks between which to determine the distance. In some instances, the facial processing component 230 determines the one or more distances between predetermined facial landmarks, as described below.

In some embodiments, the operation 410 is performed by one or more sub-operations. In operation 412, the facial processing component 230 determines a first distance between facial landmarks of the set of facial landmarks representing eyes depicted on the portion of the face. To measure the first distance, the facial processing component 230 may identify a facial landmark associated with each eye. These facial landmarks may be the inner most landmarks associated with the eye. In some instances, the facial processing component 230 may determine the inner most landmarks associated with the eye by comparing each of the facial landmarks of one eye to the other eye. After identifying the innermost facial landmarks of each eye, the facial processing component 230 determines the first distance between the inner most facial landmarks.

In operation 414, the facial processing component 230 determines a second distance between facial landmarks of the set of facial landmarks representing the eyes and a nose depicted on the portion of the face. In some embodiments, the facial processing component 230 determines the second distance between a selected facial landmark of each eye (e.g., the inner most facial landmark of the eye) and a selected facial landmark associated with the nose. The facial processing component 230 may also determine the second distance as a plurality of distances between one or more facial landmark of each eye and one or more facial landmark of the nose. For example, the facial processing component 230 may identify each eye facial landmark and identify each nose facial landmark and determine a distance between each eye facial landmark and each nose facial landmark to generate the plurality of distances. Although described as a pair of distances and a plurality of distances between each facial landmark, it should be understood that the facial processing component 230 may determine any number of distances between any number of the facial landmarks associated with the nose and facial landmarks associated with the eyes.

In operation 416, the facial processing component 230 determines a third distance between facial landmarks of the set of facial landmarks representing the eyes and a mouth depicted on the portion of the face. The facial processing component 230 may determine a single facial landmark of each eye and determine a distance from those landmarks to distinct facial landmarks of the mouth. For example, the facial processing component 230 may determine the third distance by determining distances between an outer most corner of a first eye and an outer most corner of a mouth on a first side of the face and an outer most corner of a second eye and an outer most corner of a mouth on a second side of the face. Although described with specified facial landmarks, it should be understood that the facial processing component 230 may determine the second distance or a plurality of second distances based on distances determined between any or all of the facial landmarks of the eyes and any or all of the facial landmarks of the mouth.

In operation 418, the facial processing component 230 determines a fourth distance between facial landmarks of the set of facial landmarks representing the eyes and a chin depicted on the portion of the face. In determining the fourth distance, the facial processing component 230 or the characteristic component 240 may determine a position of one or more chin facial landmarks. After determining the position of the one or more chin landmarks, the facial processing component 230 may determine one or more distances between one or more facial landmarks of each eye and one or more chin landmarks.

Figure 5:
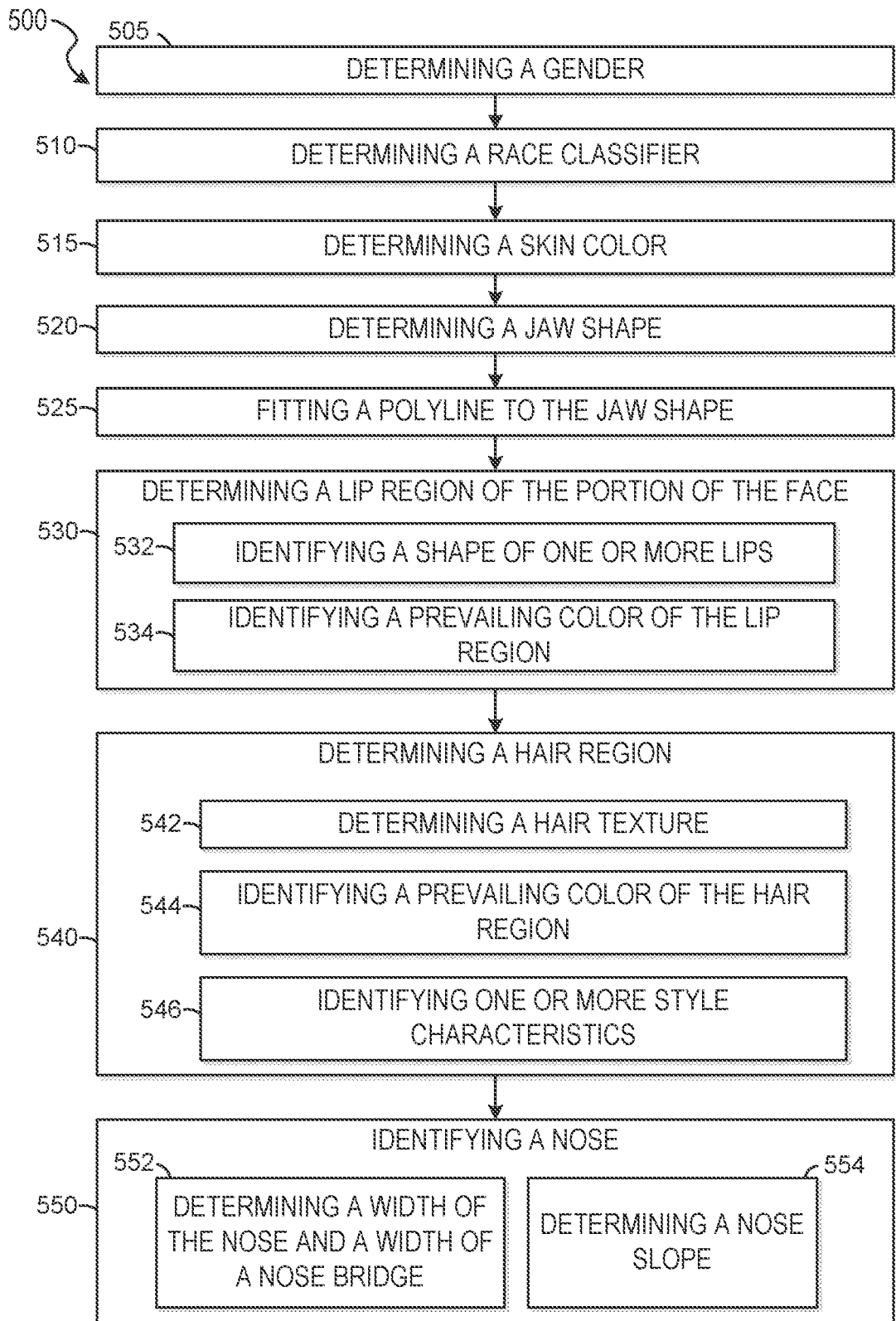
FIG. 5 is a flow diagram illustrating an example method for segmenting an image to generate a representation of a portion of the image, according to some example embodiments.

FIG. 5 depicts a flow diagram illustrating an example method 500 for segmenting portions of a video stream and extracting and modifying colors of the video stream based on the segmentation. The operations of method 500 may be performed by components of the avatar generation system 160. In some instances, certain operations of the method 500 may be performed using one or more operations of the methods 300 or 400, in one or more of the described embodiments, or as sub-operations of one or more operations of the methods 300 or 400, as will be explained in more detail below.

In operation 505, the characteristic component 240 determines a gender of the portion of the face based on the one or more distances between the two or more facial landmarks. In some embodiments, the gender determined by the characteristic component 240 may be a preliminary gender, modified by one or more additional operations or input. In some embodiments, the characteristic component 240 determines the preliminary gender based on common low level visual patterns of the one or more facial landmarks and distances between the two or more facial landmarks. In some instances, the characteristic component 240 determines the preliminary gender based on common low level visual patterns of the face depicted in the image without use of the one or more facial landmarks. The characteristic component 240 may also determine the preliminary gender based on user input within a user interface. For example, a data entry field (e.g., a text box, a dialog box, a set of radio buttons) may be presented within a user interface at a client device. Selection of an option in the data entry field or input of data into the data entry field (e.g., entering text into a text box) may identify a gender and be passed to the characteristic component 240.

In some embodiments, after determining the preliminary gender and generating the representation of the face with respect to the preliminary gender, the avatar generation system 160 presents a gender confirmation at the client device 110. The gender confirmation may include a presentation on a user interface of the client device 110 with one or more user interface elements. In some embodiments, the gender confirmation may include the representation of the face. The one or more user interface elements may include an acceptance element and a rejection element. Selection of the acceptance element indicates acceptance of the preliminary gender, modifying the preliminary gender to a selected gender status. Selection of the rejection element indicates rejection of the preliminary gender. In some instances, after selection of the rejection element, the avatar generation system 160 causes presentation of a set of user interface elements (e.g., gender) for gender selection. Each gender element of the set of user interface elements may represent a gender. Selection of a gender element causes the avatar generation system 160 to modify the representation of the face from the preliminary gender to the selected gender of the gender element.

In operation 510, the characteristic component 240 determines a race identifier of the portion of the face based on the one or more distances between the two or more facial landmarks. In some embodiments, the race identifier may be understood as an ethnicity of an individual or the portion of the face depicted within an image. In these embodiments, the ethnicity may be selected from a set of available ethnicities by the characteristic component based on the portion of the face depicted within the image. The characteristic component 240 may determine the race identifier based on common low level visual patterns of the one or more facial landmarks and distances between two or more facial landmarks.

In some embodiments, after determining the race identifier and generating the representation of the face with respect to the race identifier, the avatar generation system 160 presents a set of user interface elements at the client device 110. The set of user interface elements may also include the representation of the face. The user interface elements may include acceptance and rejection elements. Selection of the rejection element indicates rejection of the race identifier. Upon receiving selection of the rejection element, the avatar generation system 160 may cause presentation of a set of user interface elements for modifying one or more attributes of the avatar including facial feature shapes; hair, skin, and eye color; hair style; and other attributes. Selection of or modification of the one or more attributes may cause the avatar generation system 160 to modify the representation of the face from the determined race identifier to corresponding with the selected modifications.

In some instances, once the characteristic module 240 determines the race identifier, where templates are used to match identified features, the characteristic module 240 determines a subset of available templates for selection for one or more of the identified features. The characteristic module 240 may determine the subsets of templates for identified features based on the determined race identifier.

In operation 515, the characteristic component 240 determines a skin color by identifying an area of interest on the portion of the face and extracting an average color depicted within the area of interest. In some embodiments, the characteristic component 240 identifies an area of interest as a portion of the face depicted within the image located a predetermined distance below one or more of the eyes depicted on the face. The characteristic component 240 extracts the average color from the area of interest. In some embodiments, the characteristic component 240 passes one or more values for the average color to the avatar component 250. The avatar component 250 may then apply the one or more values to the representation of the face. In some instances, the characteristic component 240 may identify a skin template from a set of skin templates. The skin templates of the set of skin templates depicting variations of skin tone for application to the representation of the face. The characteristic component 240 may pass the identified skin template to the avatar component 250 for application to the representation of the face.

In operation 520, the characteristic component 240 determines a jaw shape of the portion of the face based on the set of facial landmarks and the one or more distances between the two or more facial landmarks. In some embodiments, the characteristic component 240 determines the jaw shape as a portion of the one or more facial landmarks of the portion of the face. The characteristic component 240 may identify the jaw portion of the one or more facial landmarks by identifying a set of facial landmarks positioned below one or more facial landmarks associated with a mouth, and extending around the facial landmarks associated with the mouth to a position in a plane extending outwardly from facial landmarks representing nostrils depicted on the portion of the face.

In operation 525, the characteristic component 240 fits a polyline to the jaw shape. The polyline may be a connected sequence of line segments extending from a first end of the jaw shape to a second end of the jaw shape. The first and second ends of the jaw shape may be positioned on the plane extending outwardly from facial landmarks of the nostrils. In some embodiments, the polyline may be fit by determining a number of facial landmarks identified within the jaw shape and connecting each facial landmark in succession from the first end of the jaw shape to the second end of the jaw shape. In some embodiments, the polyline may be a smooth approximate curve which passes through one or more facial landmarks of the jaw shape. The approximate curve may also pass through or travel along edges of the jaw shape such as canny edges. In some embodiments, the characteristic component 240 uses the output of the facial landmark detection instead of a polyline.

In operation 530, the characteristic component 240 determines a lip region of the portion of the face. In some embodiments, the operation 530 comprises one or more sub-operations, determining further characteristics of the lip region. The characteristic component 240 may determine the lip region as one or more facial landmarks positioned between the jaw shape and facial landmarks representing the nose. In some embodiments, the characteristic component 240 may determine the lip region as a set of facial landmarks having a shape corresponding to a predetermined lip shape. In some instances, the characteristic component 240 may determine the lip region using identified facial landmarks of a mouth (e.g., mouth landmarks). The characteristic component 240 may also build lips using one or more binarization and clustering techniques.

In operation 532, the characteristic component 240 identifies a shape of one or more lips within the lip region. The characteristic component 240 may identify the shape of the one or more lips based on comparing the set of facial landmarks of the mouth to a predetermined lip shape. The set of facial landmarks for the mouth may correspond to the predetermined lip shape within a predetermined threshold of error. The set of facial landmarks for the mouth region may identify a mouth width, an upper lip thickness, a lower lip thickness, and a cupid's bow size of the upper lip. The cupid's bow may be understood to be a depression within an upper lip of the mouth caused by a philtrum extending between a lower portion of the nose and the upper lip.

In operation 534, the characteristic component 240 identifies a prevailing color of the lip region. The characteristic component 240 may identify the prevailing lip color by identifying the one or more areas of interest for the upper lip and the lower lip. The characteristic component 240 may identify an average color for the one or more areas of interest and extract the average color. In some embodiments, the characteristic component 240 passes a value for the average color to the avatar component 250 for application of the average color to the lips of the representation of the face.

In operation 540, the characteristic component 240 determines a hair region of the portion of the face. The characteristic component 240 may identify the hair region based on the position of the one or more facial landmarks. In some embodiments, the characteristic component 240 determines a perimeter and orientation of the portion of the face based on the one or more facial landmarks. The characteristic component 240 may then identify the hair region as a region of interest positioned proximate to one or more facial landmarks. In some embodiments, the characteristic component 240 determines the existence of hair within the hair region based on color matching and color differentiation operations, to differentiate one or more color of the hair region from one or more color of the portion of the face and one or more color of a background of the image. In some embodiments, the characteristic component 240 may perform one or more pattern matching operations to identify the hair region. In some embodiments, the characteristic component 240 segments the hair region from the remaining portions of the image to isolate the hair region. In some embodiments, the operation 540 comprises one or more sub-operations, determining further characteristics of the hair region.

In operation 542, the characteristic component 240 determines a hair texture for the hair region. In some embodiments, where hair is identified within the hair region, the characteristic component 240 determines the hair texture based on one or more object or shape recognition operations. The characteristic component 240 may detect the hair texture using edge detection to identify edges of curls within the hair or smooth outlines of hair. In some instances, the characteristic component 240 may identify a set of colors within the hair (e.g., lighter and darker regions and shapes within the hair) to determine the hair texture, using variations in the set of colors to identify edges, objects, or shapes within the hair indicating hair texture.

In operation 544, the characteristic component 240 identifies a prevailing color of the hair region. In some embodiments, the characteristic component 240 identifies one or more colors within the hair region. The characteristic component 240 may determine an average or prevailing color from the one or more colors identified in the hair region. The characteristic component 240 then extracts the average color (e.g., the prevailing color) from the hair region. In some embodiments, the characteristic component 240 passes one or more values for the average color of the hair region to the avatar component 250. The avatar component 250 applies the one or more values to the representation of the hair used in the representation of the face. In some instances, the characteristic component 240 may identify a hair template from a set of hair templates. The hair templates of the set of hair templates depicts variations of hair color for application to the representation of the face. The characteristic component 240 may pass the identified hair template to the avatar component 250 for application to the representation of the face.

In operation 546, the characteristic component 240 identifies one or more style characteristics of the hair region. The characteristic component 240 may identify the one or more style characteristics based on a size and shape of the identified hair region, described above. For example, the characteristic component 240 may identify hair length and hair volume based on dimensions of the hair region in comparison with the one or more facial landmarks. The characteristic component 240 may identify the hair volume based on a distance the hair region extends from a portion of the facial landmarks representing an outline of the face and an outer opposing edge of the hair region. The characteristic component 240 may identify the hair length based on the dimensions determined for hair volume and a distance from the hair region to a subset of facial landmarks representing a chin. For example, the characteristic component 240 may identify long hair where the hair region extends below the subset of facial landmarks representing the chin and short hair where the hair region fails to extend beyond one or more of the facial landmarks of the subset of facial landmarks which represent an upper portion of the chin.

In some instances, the characteristic component 240 may identify the one or more style characteristics based on color variation between the hair region, portions of the face represented by the facial landmarks, and a background of the image. For example, the characteristic component 240 may identify a presence or absence of bangs where a prevailing color of the hair region is detected between the set of facial landmarks representing the outline of the face and a set of facial landmarks representing one or more eyes.

In operation 550, the characteristic component 240 identifies a nose depicted on the portion of the face. In some embodiments, the operation 550 may comprise one or more sub-operations. As shown in FIG. 5, the operation 550 has two sub-operations for determining further characteristics of the nose.

In operation 552, the characteristic component 240 determines a width of the nose and a width of the nose bridge. The characteristic component 240 may identify a set of nasal facial landmarks from among the one or more facial landmarks representing the face. For example the characteristic component 240 may identify facial landmarks representing one or more eye and a mouth within the portion of the face. The characteristic component 240 may identify the set of nasal facial landmarks as the facial landmarks occurring between a portion of the facial landmarks for the eye and the mouth. The characteristic component 240 may also identify the set of nasal facial landmarks based on a numeration of the set of facial landmarks. For example, the characteristic component 240 may identify landmarks numbered fifteen, sixteen, seventeen, and eighteen as nose landmarks, one or more of which correspond to the nasal facial landmarks. To measure the width of the nose, as a distance between two or more facial landmarks representing an outer most portion of an ala on a first side of the nose and an ala on a second (e.g., opposing) side of the nose.

The characteristic component 240 may determine the width of the nose bridge by identifying two or more facial landmarks representing the bridge of the nose. In some embodiments, the characteristic component 240 identifies the two or more facial landmarks for the bridge of the nose as facial landmarks positioned between the inner most facial landmarks of each eye and between facial landmarks of the eyes and facial landmarks of the mouth or the ala of the nose. In some instances, the characteristic component 240 identifies the two or more facial landmarks for the bridge of the nose as landmarks within the above-described region of the face and positioned a distance apart on a plane. The characteristic component 240 may then measure the distance between the two identified facial landmarks. In some embodiments, where greater than two facial landmarks are identified for the bridge of the nose, the characteristic component 240 may determine a set of measurements corresponding to differing portions of the bridge of the nose. In some instances, the set of measurements may be passed to the avatar component 250 for use in generating the representation of the face. The characteristic component 240, having a set of measurements, may determine an average measurement or a representative measurement of the set of measurements to pass to the avatar component 250 for use in generating the representation of the face.

In operation 554, the characteristic component 240 determines a nose slope by determining a visible area of one or more nostrils and one or more edges proximate to the nose. In some embodiments, the characteristic component 240 may identify the one or more edges proximate to the nose using a canny edge detector for edges of the nose extending between facial landmarks identifying the mouth and one or more eye. In some embodiments, one or more of the facial landmarks for the bridge of the nose may be positioned on or proximate to the one or more edges proximate to the nose.

Figure 6:
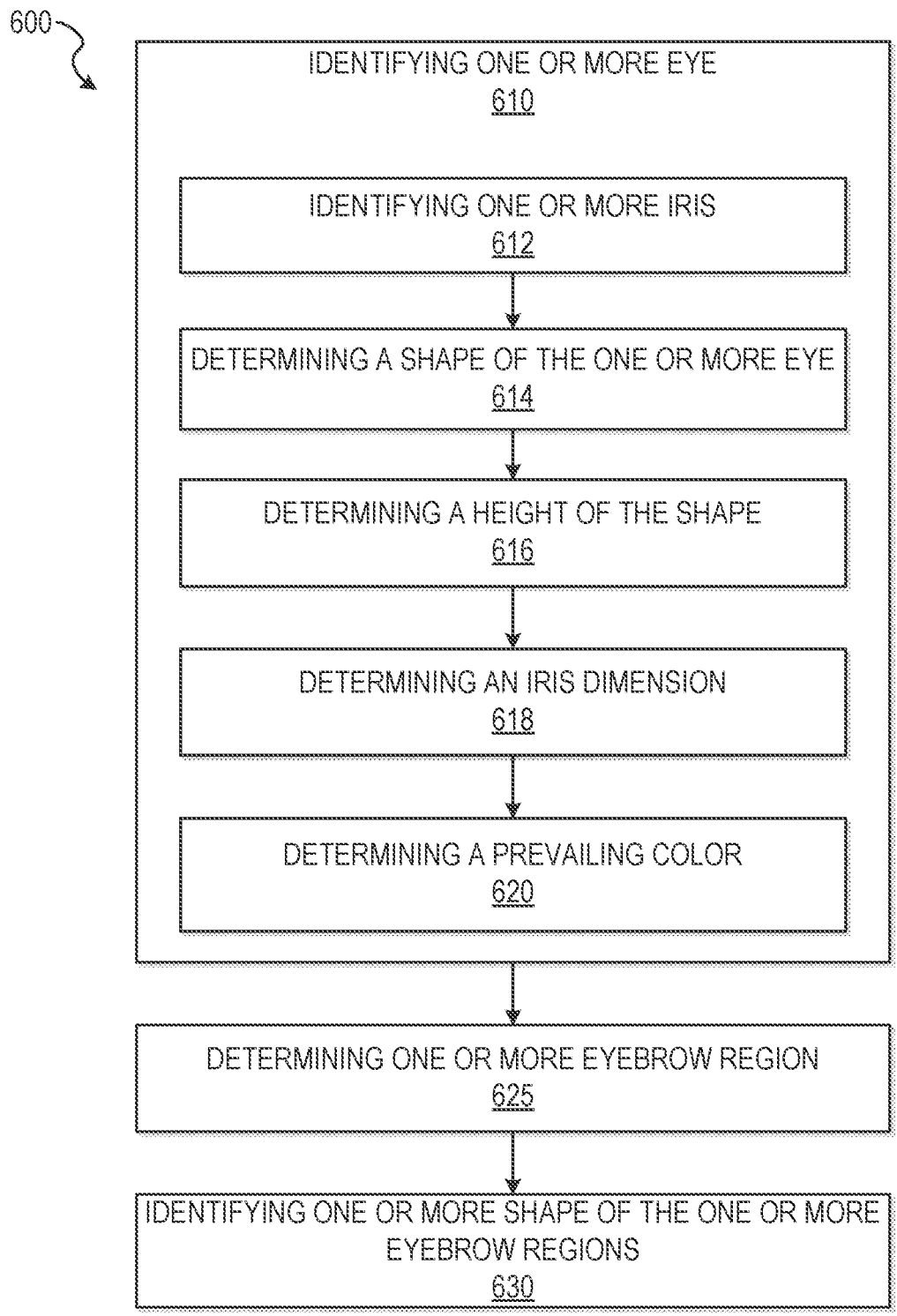
FIG. 6 is a flow diagram illustrating an example method for segmenting an image to generate a representation of a portion of the image, according to some example embodiments.

FIG. 6 shows a flow diagram illustrating an example method 600 for generating representations of a face from a set of images. The operations of method 600 may be performed by components of the avatar generation system 160. In some instances, certain operations of the method 600 may be performed using one or more operations of the method 300, 400, or 500 or as sub-operations of one or more operations of the method 300, 400, or 500, as will be explained in more detail below.

In operation 610, the characteristic component 240 identifies one or more eye within the portion of the face. In some embodiments, the operation 530 may comprise one or more sub-operations for performing image segmentation of predetermined portions of the one or more eyes.

In operation 612, the characteristic component 240 identifies one or more iris within the portion of the face and within the one or more eyes. In some embodiments, the characteristic component 240 identifies the one or iris by identifying a set of eye landmarks of the one or more facial landmarks identified for the portion of the face. The characteristic component 240 may identify the set of eye landmarks based on an aggregate shape, location, or any suitable method. For example, the characteristic component 240 may identify the set of eye landmarks as a set of facial landmarks positioned between landmarks representing the mouth and the eyebrows and spaced a distance apart such that one or more of the nasal facial landmarks are positioned between one or more eye landmarks of the set of eye landmarks. The set of eye landmarks may include facial landmarks representing an outline of the eye and a facial landmark representing an estimated center of a pupil for each eye.

The characteristic component 240 may initially identify the iris circular shape surrounding the facial landmark for the center of a pupil. In some embodiments, the iris is identified based on a color change between the iris and a sclera of each eye positioned within the set of eye landmarks.

In operation 614, the characteristic component 240 determines a shape of the one or more eyes. In some embodiments, the shape of the one or more eyes surrounds the one or more iris. The characteristic component 240 may determine the shape of the eye as a shape formed from the eye landmarks surrounding the facial landmark representing the center of the pupil. In some embodiments, to determine or form the shape of the eye, the characteristic component 240 may generate a polyline extending between the eye landmarks representing the outline of the eye.

In operation 616, the characteristic component 240 determines a height of the shape based on the set of facial landmarks. The characteristic component 240 may determine the height of the shape by identifying a first distance and a second distance for each eye. The first distance may be the largest distance between to eye landmarks forming the outline of the eye. The first distance may be understood as the distance between a first corner and a second corner of the eye. The second distance may be understood as a distance between two of the eye landmarks positioned a distance apart on a plane substantially perpendicular to a plane of the first distance. In some instances, the second distance is determined as the height of the shape. The second distance may be identified as the greatest distance between two opposing eye landmarks which extends substantially perpendicular to the plane of the first distance.

In some instances, the characteristic component 240 determines the shape of the eye using an iterative approach. The characteristic component 240 may determine the points on the eye forming the eye contour inside the eyelids and generates a curve extending along the points. The characteristic component 240 may perform one or more alignment operations to determine an initial inner eye contour. The characteristic component 240 may then use the initial inner eye contour as an input for the one or more alignment operations to generate a subsequent inner eye contour. The characteristic component 240 may perform the one or more alignment operations a predetermined number of times (e.g., four times) to generate a final inner eye contour. In some instances, the characteristic component 240 dynamically determines the inner eye contour by performing the one or more alignment operations, using each successive inner eye contour as an input for a subsequent performance of the one or more alignment operations. The characteristic component 240 may dynamically determine the inner eye contour by performing the one or more alignment operations until a contour difference between a prior inner eye contour and a current inner eye contour is below a predetermined threshold (e.g., ten percent).

In operation 618, the characteristic component 240 may determine an iris dimension for each of the one or more irises based on the height of the shape of the one or more eyes. The characteristic component 240 may determine the iris dimension as a proportion of the eye based on one or more of the height of the shape and the first distance. The proportion may be a predetermined proportion of iris to height of the shape.

In operation 620, the characteristic component 240 determines a prevailing color for the one or more iris. The characteristic component 240 may determine the prevailing eye color as an average of one or more colors detected within pixels of the image positioned within the iris dimension determined in the operation 618. In some embodiments, the characteristic component 240 extracts the prevailing color as one or more color values and passes the one or more color values to the avatar component 250 for application to the representation of the face. In some embodiments, the avatar component 250 identifies an eye color template from a set of eye color templates having a color value closest to the one or more color values supplied by the characteristic component 240 and selects the identified eye color template for use in generating the representation of the face.

In operation 625, the characteristic component 240 determines one or more eyebrow region of the portion of the face. The characteristic component 240 may determine the one or more eyebrow region as one or more facial landmarks positioned between the facial landmarks representing the eyes and the hair region.

In operation 630, the characteristic component 240 identifies one or more shape of the one or more eyebrow region. The characteristic component 240 may determine the one or more shape of the eyebrow region using a self-quotient image algorithm. The one or more shape may be passed to the avatar component 250 for application to the representation of the face. In some embodiments, the avatar component 250 compares the one or more shape to a set of eyebrow templates, where the set of eyebrow templates depict differing shapes of eyebrows. The avatar component 250 may select an eyebrow template from the set of eyebrow templates based on the comparison of the one or more shape to the set of eyebrow templates. For example, the avatar component 250 may identify a bend position (e.g., an arch) within the one or more shape and a distance of a first end and a second end from the bend position, as well as an angle of the bend position extending between a first portion and a second portion of the one or more shape. The avatar component 250 may then select the eyebrow template with a bend position, angle, and overall length (e.g., a length extending between the first end and the second end) which are closest to the one or more shape.

In some embodiments, in identifying and rendering eyebrows, the characteristic component 240 generates a self-quotient image (SQI) binarization matrix. The SQI binarization matrix sets pixels representing the eyebrow as a zero within the matrix and pixels outside of the eyebrow as a one within the matrix. The characterization component 240 fits a first polynomial curve across an upper edge of the pixels represented by zeros and a second polynomial curve across a lower edge of the pixels represented by zeros. The first polynomial curve represents the upper edge of the eyebrow and the second polynomial curve represents the lower edge of the eyebrow. The characteristic component 240 may use the second polynomial curve as a reference line, connecting the ends of the first polynomial line to the ends of the second polynomial line to form the inner edge and outer edges of the eyebrow.

Figure 7:
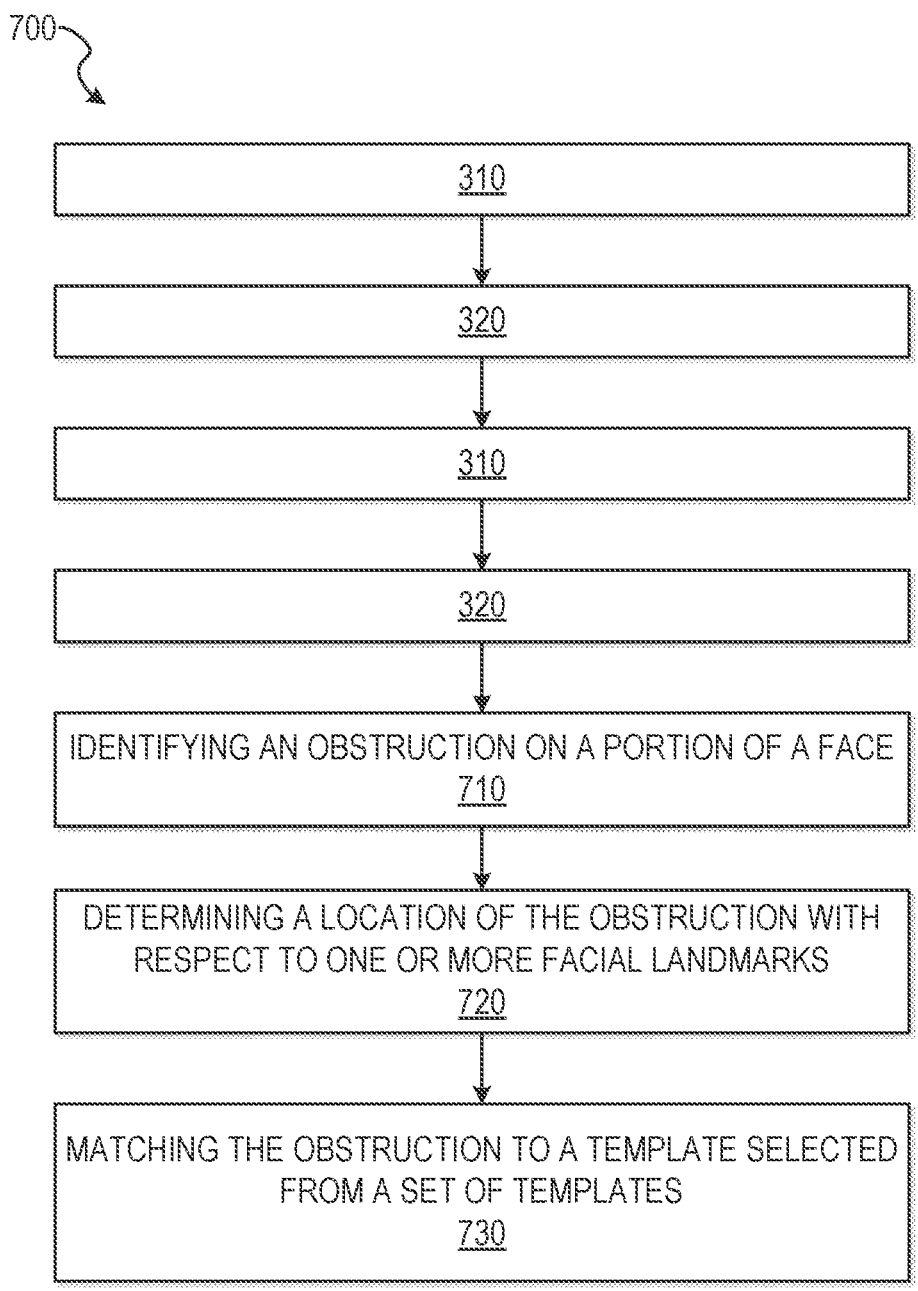
FIG. 7 is a flow diagram illustrating an example method for segmenting an image to generate a representation of a portion of the image, according to some example embodiments.

FIG. 7 shows a flow diagram illustrating an example method 700 for generating representations of a face from a set of images. The operations of method 700 may be performed by components of the avatar generation system 160. In some instances, certain operations of the method 700 may be performed using one or more operations of the method 300, 400, 500, or 600 or as sub-operations of one or more operations of the method 300, 400, 500, or 600, as will be explained in more detail below.

In operation 710, the characteristic component 240 identifies an obstruction on the portion of the face. In some embodiments, the characteristic component 240 identifies the obstruction based on low level representations depicted on the portion of the face. The low level representations may include edges, texture, color, shape, and combinations thereof. For example, the characteristic component 240 may identify the obstruction (e.g., a moustache, goatee, or beard) based on a change in prevailing color exceeding a predetermined threshold (e.g., a distance between a value for the prevailing color and a value for a color of a potential obstruction). In some instances, the characteristic component 240 identifies the obstruction (e.g., glasses) based on edge detection of an object depicted on the face. The characteristic component 240 may incorporate one or more machine learning techniques to generate a library of detection methods, models, and examples to detect obstructions and differentiate between differing types of obstructions. For example, the characteristic component 240 may incorporate machine learning techniques to distinguish between and detect a beard and a hair texture.

In operation 720, the characteristic component 240 determines a location of the obstruction with respect to one or more of the facial landmarks. In some embodiments, the characteristic component 240 identifies one or more facial landmarks positioned proximate to the obstruction. The characteristic component 240 may also identify one or more facial landmarks which are expected within the area of the obstruction, but are not present.

In operation 730, the characteristic component 240 matches the obstruction to a template selected from a set of templates. In some embodiments, the characteristic component 240 selects a template from a set of templates based on the location of the obstruction determined in the operation 720. For example, the set of templates may include glasses templates, facial hair templates, and clothing templates (e.g., hat templates, helmet templates, scarf templates, or head covering templates). The characteristic component 240 may select a set of hat templates from the clothing templates where the obstruction obscures the hair region or a portion of facial landmarks representing a forehead of the face. The characteristic component 240 may select a set of glasses templates where the obstruction encompasses or is positioned proximate to facial landmarks representing the eyes and the nose. The characteristic component 240 may select a set of facial hair templates where the obstruction is positioned proximate to or obscures facial landmarks representing the mouth or the jaw line.

Although described using operations 710, 720, and 730, the characteristic component 240 may perform these operations in any suitable order to identify, characterize, and match obstructions. In some embodiments, the characteristic component 240 may perform the operation 720 to select a region of the portion of the face where obstructions commonly appear. The characteristic component 240 may then perform operation 710 to use facial landmarks to identify whether an obstruction is present in the selected region. In operation 710, the characteristic component 240 may use one or more machine learning or modeling techniques to identify the obstruction. The characteristic component 240 may then perform operation 730 to match the obstruction to a template.

In some embodiments, where the characteristic component 240 detects an obstruction at a lower portion of a face, the characteristic component 240 may perform one or more operations to identify the obstruction as facial hair and apply a representation of the facial hair to the representation of the face. The characteristic module 240 may generate an SQI binarization matrix or perform SQI binarization to generate a binary image or smoothed image for skin regions and providing a recognizable pattern for facial hair regions. In some instances, the characteristic component 240 performs a texture recognition operation. The texture recognition operation may identify pixels in one or more regions of the obstruction indicating presence of facial hair. The characteristic component 240 may use color, shape, or other suitable indicators for the texture recognition operation to detect facial hair within the region of the obstruction. The characteristic component 240 may then identify neighboring pixels within the obstruction region that share the texture indicators representing facial hair.

The characteristic component 240 may divide the obstruction region into a set of obstruction sub-regions to identify facial hair obstruction on various portions of the face. The characteristic component 240 may perform the texture recognition operation on a mustache region (e.g., a region between the nose and the upper lip and extending downward on the face proximate to corners of the mouth), a chin region, and a sideburn region (e.g., two regions, each extending downwardly from a position proximate to an ear and toward the jaw line and extending from the ear toward the mouth.). For each obstruction sub-region, the characteristic component 240 may select a template for the facial hair obstruction having a shape and color proximate to the shape and color of the facial hair obstruction detected in the sub-region.

Once the characteristic component 240 selects a template set (e.g., a set of hat templates, a set of glasses templates, or a set of facial hair templates), the characteristic component 240 may identify a template from the template set to act as an approximation for the obstruction. In some embodiments, the characteristic component 240 performs edge recognition on the object and the template set to identify the template of the template set having one or more dimensions or characteristics which most closely match the obstruction. Upon selecting the template, the characteristic component 240 passes the selected template to the avatar component 250 for application to the representation of the face. Although described as a single obstruction and a single template, the characteristic component 240 may identify a plurality of obstructions and select templates suitable to each obstruction of the plurality of obstructions. For example, the characteristic component 240 may identify two obstructions representing a glasses and a beard. The characteristic component 240 may select a glasses template matching the glasses obstruction and a beard template matching the beard obstruction.

In some embodiments, the characteristic component 240 uses a steerable filter for detecting wrinkles and application of the wrinkles to the representation of the face. The characteristic component 240 may detect lines on a surface of the face (e.g., a forehead and around a mouth) using the steerable filter. Once detected, the characteristic component 240 may select a wrinkle template for application to the representation of the face. In some instances, for each wrinkle, the characteristic component 240 determines if the line for the wrinkle exceeds a predetermined length and fit a line to the wrinkle. The characteristic component 240 may determine a relative location of each wrinkle to one or more facial landmarks. The characteristic component 240 may then transfer the shape and relative position of the wrinkle to the representation of the face.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 8:
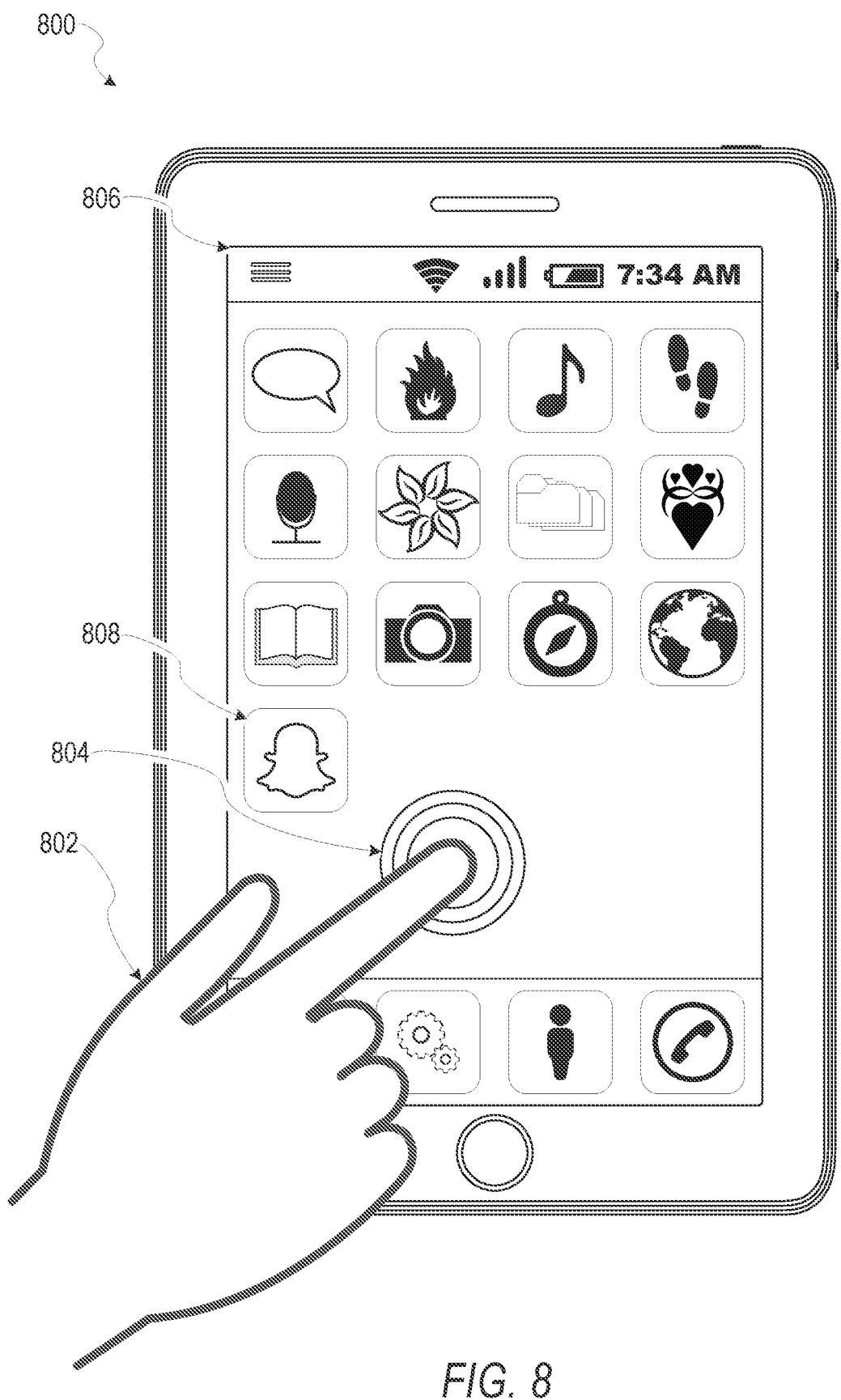
FIG. 8 is a user interface diagram depicting an example mobile device and mobile operating system interface, according to some example embodiments.

FIG. 8 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device may be a camera or any other device coupled to the mobile device 800 capable of capturing a video stream or one or more successive images. The imaging device 808 may be triggered by the avatar generation system 160 or a selectable user interface element to initiate capture of a video stream or succession of images and pass the video stream or succession of images to the avatar generation system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the avatar generation system 160 may identify, track, extract, and generate representations of a face within the ephemeral video clip, as the ephemeral video clip is being captured by the device and transmit the ephemeral video clip to another device using the ephemeral message system.

Software Architecture

Figure 9:
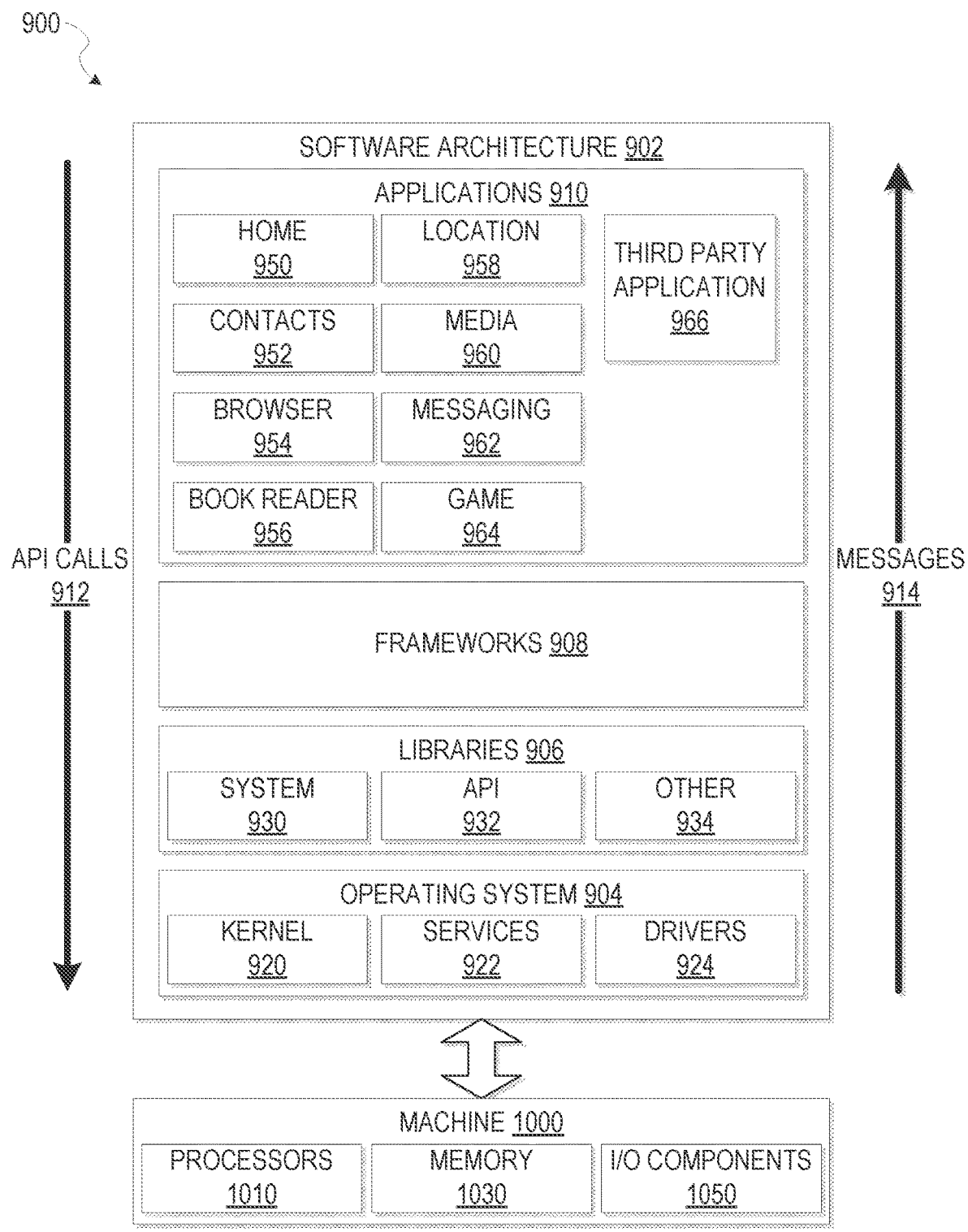
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 966 can invoke the API calls 912 provided by the operating system 904 to facilitate functionality described herein.

Example Machine Architecture and Machine-Readable Medium

Figure 10:
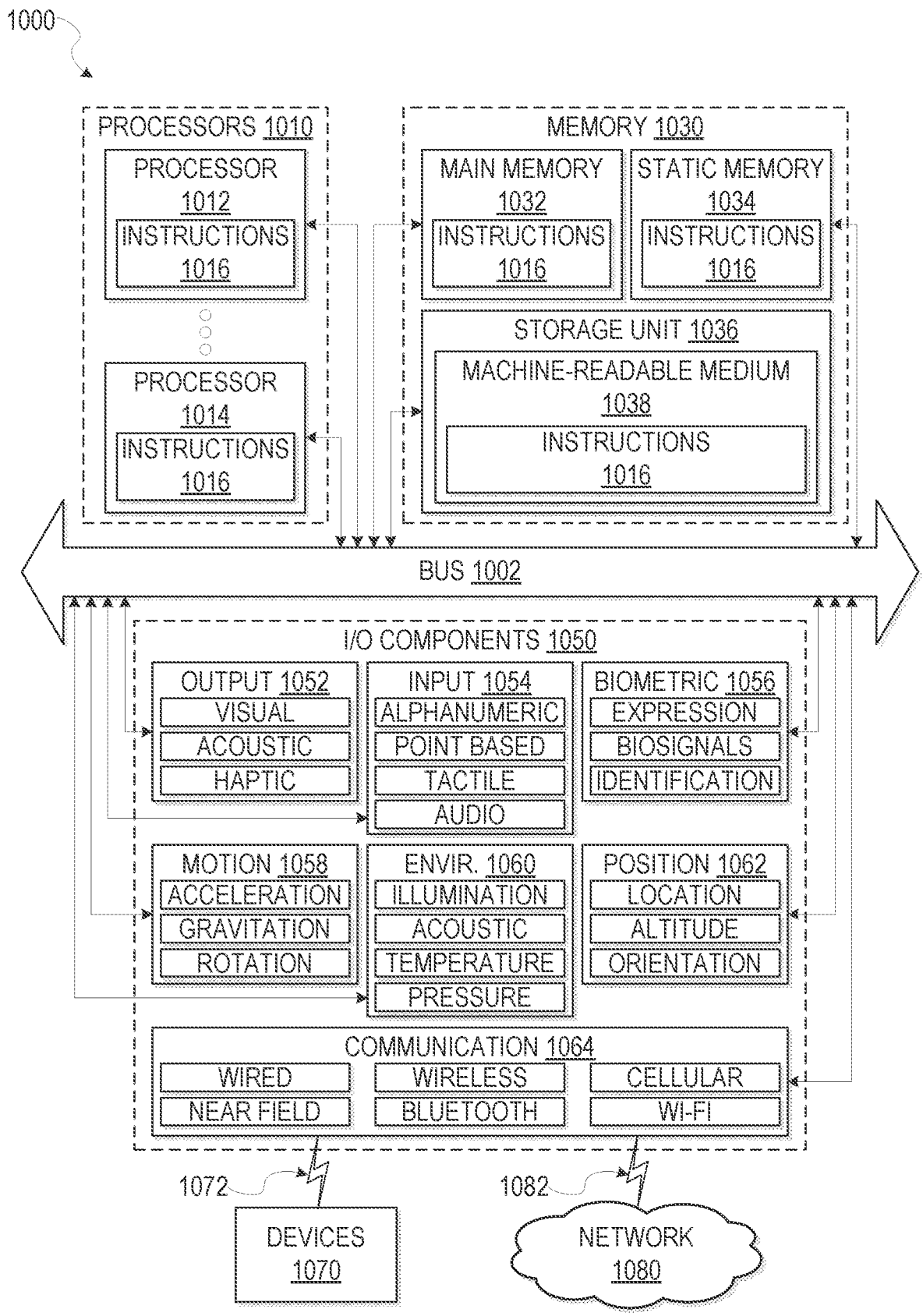
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory machine-readable storage medium) and perform any of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving, by one or more processors, an image depicting at least a portion of a face of a first user;
   determining that an obstruction is present in a hair region using one or more of a set of facial landmarks;
   selecting a set of hat templates from clothing templates in response to determining that the obstruction obscures the hair region of a portion of the set of facial landmarks representing a forehead of the face;
   generating, by the one or more processors, a representation of the face of the first user depicted in the image based on a given one of the selected set of hat templates; and
   generating, by a client device of the first user, a message, directed to a second user, that includes the generated representation of the face of the first user.

2. The method of claim 1, further comprising:
   selecting a region of the face where obstructions commonly appear; and
   in response to determining that the obstruction is present, matching the obstruction to a template selected from a set of templates based on a location of the obstruction.

3. The method of claim 1, further comprising:
   determining a hair texture of the hair region of the face of the first user depicted in the image;
   comparing a dimension of the hair region to one or more of a set of facial landmarks within a portion of the face; and
   determining hair length based on the comparison of the dimension of the hair region to the one or more of the set of facial landmarks; and
   generating the representation of the face of the first user depicted in the image based on the determined hair texture and hair length of the hair region.

4. The method of claim 1 further comprising:
   presenting a confirmation message that includes the representation of the face and an acceptance user interface element and a rejection user interface element;
   in response to receiving input selecting the rejection user interface element, causing presentation of a plurality of user interface elements for modifying a physical attribute of the generated representation of the face; and
   in response to receiving input selecting one of the plurality of user interface elements, modifying the representation of the face based on the selected one of the plurality of user interface elements.

5. The method of claim 1, further comprising:
   identifying a set of colors within the hair region of the face; and
   determining variations in the set of colors that indicate edges, objects or shapes within hair associated with hair texture.

6. The method of claim 5, further comprising:
   comparing a dimension of the hair region to one or more of the set of facial landmarks; and determining a hair length of the hair region based on the comparison of the dimension of the hair region to the one or more of the set of facial landmarks.

7. The method of claim 1, further comprising:
identifying the set of facial landmarks within the portion of the face; and
in response to identifying the set of facial landmarks, determining one or more characteristics representing the portion of the face depicted in the image by identifying a set of colors within the hair region of the face, wherein a determination of a hair texture is based on variations in the set of colors that indicate edges, objects or shapes within hair associated with the hair texture.

8. The method of claim 1 further comprising:
determining a first physical attribute type of a portion of the face based on one or more distances between two or more facial landmarks; and
determining a second physical attribute type by identifying an area of interest on the portion of the face and extracting an average color depicted within the area of interest, wherein the representation of the face is generated based on the first and second physical attribute types.

9. The method of claim 1, further comprising:
determining one or more distances between two or more facial landmarks of the set of facial landmarks to determine one or more characteristics, the one or more characteristics being used to generate the representation of the face, wherein determining the distances comprises:
determining a first distance between facial landmarks of the set of facial landmarks representing eyes depicted on the portion of the face;
determining a second distance between facial landmarks of the set of facial landmarks representing the eyes and a nose depicted on the portion of the face;
determining a third distance between facial landmarks of the set of facial landmarks representing the eyes and a mouth depicted on the portion of the face; and
determining a fourth distance between facial landmarks of the set of facial landmarks representing the eyes and a chin depicted on the portion of the face.

10. The method of claim 1, further comprising:
identifying an iris within the face by performing operations comprising:
determining a shape of an eye surrounding the iris;
determining a height of the shape; and
determining an iris dimension based on the height of the shape of the eye; and
determining a prevailing color for the iris, wherein the representation of the face is generated based on the identified iris.

11. The method of claim 1 further comprising:
determining one or more eyebrow regions of the face; and
identifying one or more shapes of the one or more eyebrow region, wherein the representation of the face is generated based on the one or more shapes of the one or more eyebrow region.

12. The method of claim 1 further comprising:
identifying a second obstruction on the face depicted in the image; and
selecting a type of physical element to add to the generated representation of the face based on a location or position of the second obstruction on the face.

13. The method of claim 1, wherein a first hair attribute of a plurality of hair attributes of the hair region comprises hair volume, and further comprising determining the hair volume by:
identifying a first portion of the set of facial landmarks that represents an outline of the face; and
computing a distance a hair region extends from the identified portion of the set of facial landmarks that represents the outline of the face to an outer opposing edge of the hair region.

14. The method of claim 13, wherein a second hair attribute of the plurality of hair attributes comprises hair length, and further comprising determining the hair length by:
identifying a second portion of the set of facial landmarks that represents a chin; and
computing a distance from the hair region to the second portion of the set of facial landmarks that represents the chin.

15. The method of claim 1, further comprising:
selecting a set of glasses templates in response to determining that a second obstruction encompasses or is positioned proximate to facial landmarks representing eyes and nose of the face; and
selecting a set of facial hair templates in response to determining that the second obstruction is positioned proximate to or obscures facial landmarks representing a mouth or jaw line of the face, wherein the representation of the face is generated based on a given one of the set of facial hair templates.

16. A system, comprising:
one or more processors; and
a non-transitory processor-readable storage medium coupled to the one or more processors and storing processor executable instructions that, when executed by the one or more processors, cause the one or more processors to perform operations comprising:
receiving an image depicting at least a portion of a face of a first user;
determining that an obstruction is present in a hair region using one or more of a set of facial landmarks;
selecting a set of hat templates from clothing templates in response to determining that the obstruction obscures the hair region of a portion of the set of facial landmarks representing a forehead of the face;
generating, by the one or more processors, a representation of the face of the first user depicted in the image based on a given one of the selected set of hat templates; and
generating, by a client device of the first user, a message, directed to a second user, that includes the generated representation of the face of the first user.

17. The system of claim 16, wherein the operations further comprise:
selecting a region of the face where obstructions commonly appear; and
in response to determining that the obstruction is present, matching the obstruction to a template selected from a set of templates based on a location of the obstruction.

18. The system of claim 16, wherein the operations further comprise:
determining a hair texture of the hair region of the face of the first user depicted in the image;
comparing a dimension of the hair region to one or more of a set of facial landmarks within a portion of the face; and determining hair length based on the comparison of the dimension of the hair region to the one or more of the set of facial landmarks; and generating the representation of the face of the first user depicted in the image based on the determined hair texture and hair length of the hair region.

19. The system of claim 16, wherein the operations further comprise:

presenting a confirmation message that includes the representation of the face and an acceptance user interface element and a rejection user interface element;

in response to receiving input selecting the rejection user interface element, causing presentation of a plurality of user interface elements for modifying a physical attribute of the generated representation of the face; and in response to receiving input selecting one of the plurality of user interface elements, modifying the representation of the face based on the selected one of the plurality of user interface elements.

20. A non-transitory processor-readable storage medium storing processor executable instructions that, when executed by a processor of a machine, cause the machine to perform operations comprising:

receiving an image depicting at least a portion of a face of a first user;

determining that an obstruction is present in a hair region using one or more of a set of facial landmarks;

selecting a set of hat templates from clothing templates in response to determining that the obstruction obscures the hair region of a portion of the set of facial landmarks representing a forehead of the face;

generating, by the one or more processors, a representation of the face of the first user depicted in the image based on a given one of the selected set of hat templates; and generating, by a client device of the first user, a message, directed to a second user, that includes the generated representation of the face of the first user.

* * * * *

UNITED STATES PATENT AND TRADEMARK OFFICE
CERTIFICATE OF CORRECTION

PATENT NO. : 11,631,276 B2  
APPLICATION NO. : 17/303875  
DATED : April 18, 2023  
INVENTOR(S) : Gusarov et al.

Page 1 of 1

It is certified that error appears in the above-identified patent and that said Letters Patent is hereby corrected as shown below:

On the Title Page

On page 4, in Column 2, under Item (56) "U.S. Patent Documents", Line 59, delete "2005/0020661" and insert --2005/0206610-- therefor On page 5, in Column 1, under Item (56) "U.S. Patent Documents", Line 57, delete "2008/0021421" and insert --2008/0214210-- therefor On page 5, in Column 2, under Item (56) "U.S. Patent Documents", Line 16, delete "2009/0008971" and insert --2009/0089710-- therefor On page 6, in Column 2, under Item (56) "U.S. Patent Documents", Line 53, delete "2012/0001651" and insert --2012/0165100-- therefor On page 11, in Column 1, under Item (56) "U.S. Patent Documents", Lines 3-4, delete "CommunicationNov." and insert --Communication dated Nov.-- therefor On page 11, in Column 1, under Item (56) "U.S. Patent Documents", Line 16, delete "2018 t"," and insert --2018",-- therefor On page 11, in Column 2, under Item (56) "U.S. Patent Documents", Line 62, delete "{Appendix P")," and insert --(Appendix P)",-- therefor Signed and Sealed this  
Twenty-third Day of July, 2024

Katherine Kelly Vidal  
*Director of the United States Patent and Trademark Office*